(12) United States Patent
Shibayama

(10) Patent No.: US 8,845,369 B2
(45) Date of Patent: Sep. 30, 2014

(54) VESSEL

(75) Inventor: Susumu Shibayama, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 334 days.

(21) Appl. No.: 13/398,984

(22) Filed: Feb. 17, 2012

(65) Prior Publication Data

US 2012/0231681 A1 Sep. 13, 2012

(30) Foreign Application Priority Data

Mar. 7, 2011 (JP) ................................. 2011-049292

(51) Int. Cl.
| | |
|---|---|
| *B63H 21/20* | (2006.01) |
| *B63H 11/107* | (2006.01) |
| *B63H 25/46* | (2006.01) |
| *B63H 21/21* | (2006.01) |
| *B60L 11/00* | (2006.01) |
| *B63H 21/17* | (2006.01) |

(52) U.S. Cl.
CPC ........ *B63H 11/107* (2013.01); *B63H 2021/205* (2013.01); *Y02T 70/5236* (2013.01); *B63H 21/20* (2013.01); *B63H 25/46* (2013.01); *B63H 21/213* (2013.01)
USPC .................................................. 440/3; 440/6

(58) Field of Classification Search
CPC ........ B63H 11/00; B63H 21/14; B63H 20/00; B63H 21/17; B63H 21/20
USPC ....................................................... 440/3, 6, 38
See application file for complete search history.

(56) References Cited

U.S. PATENT DOCUMENTS

| | | | |
|---|---|---|---|
| 6,857,918 | B1 | 2/2005 | Lebreux et al. |
| 8,579,668 | B2 * | 11/2013 | Minoura et al. ................ 440/41 |
| 2011/0166724 | A1 * | 7/2011 | Hiramatsu ...................... 701/21 |
| 2012/0164896 | A1 * | 6/2012 | Kobayashi et al. ............. 440/38 |

* cited by examiner

*Primary Examiner* — Daniel V Venne
(74) *Attorney, Agent, or Firm* — Keating & Bennett, LLP

(57) ABSTRACT

A vessel includes a first propulsion mechanism, at least one second propulsion mechanism, and a hull. The first propulsion mechanism is arranged to generate thrust by an internal combustion engine. The second propulsion mechanism is arranged to generate thrust by an electric motor. The first propulsion mechanism and the second propulsion mechanism are disposed in the hull. The first propulsion mechanism and the second propulsion mechanism are mutually independent. A direction of the thrust generated by the first propulsion mechanism and a direction of the thrust generated by the at least one second propulsion mechanism are the same as each other.

15 Claims, 19 Drawing Sheets

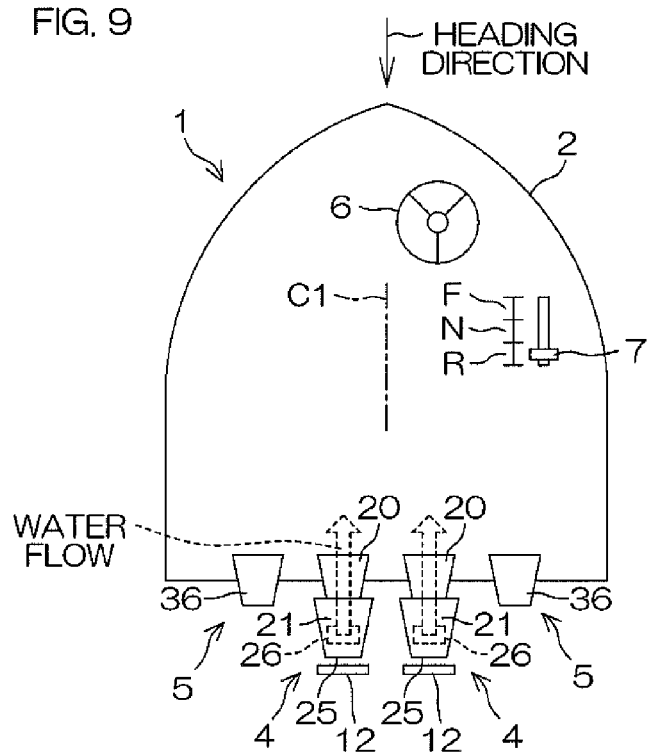
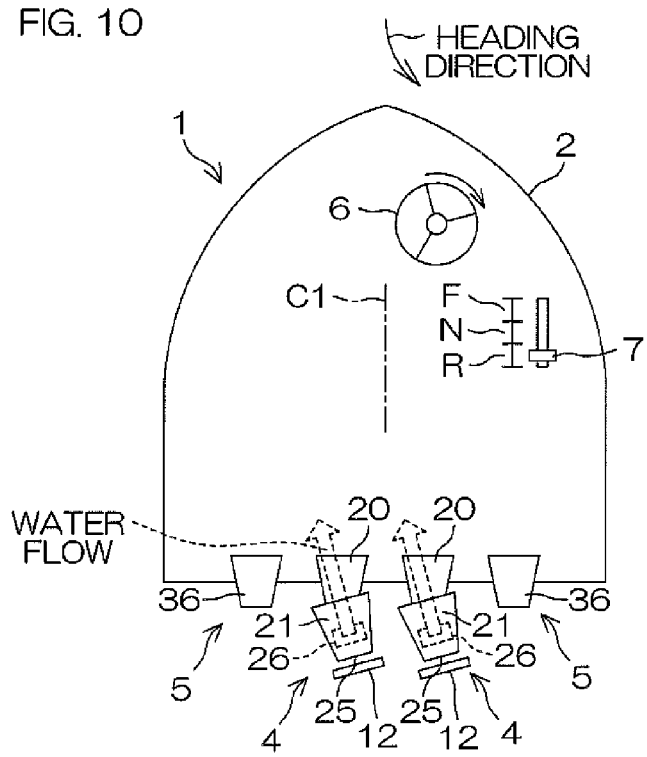

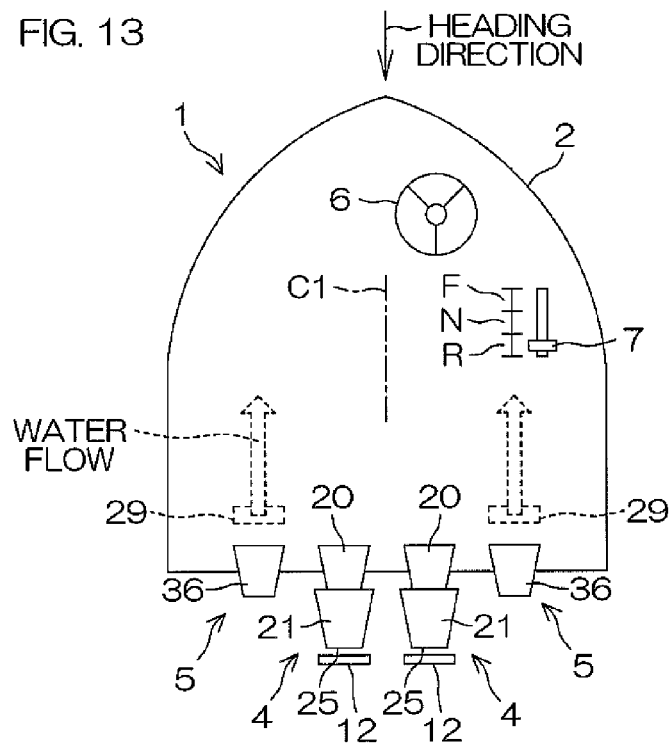
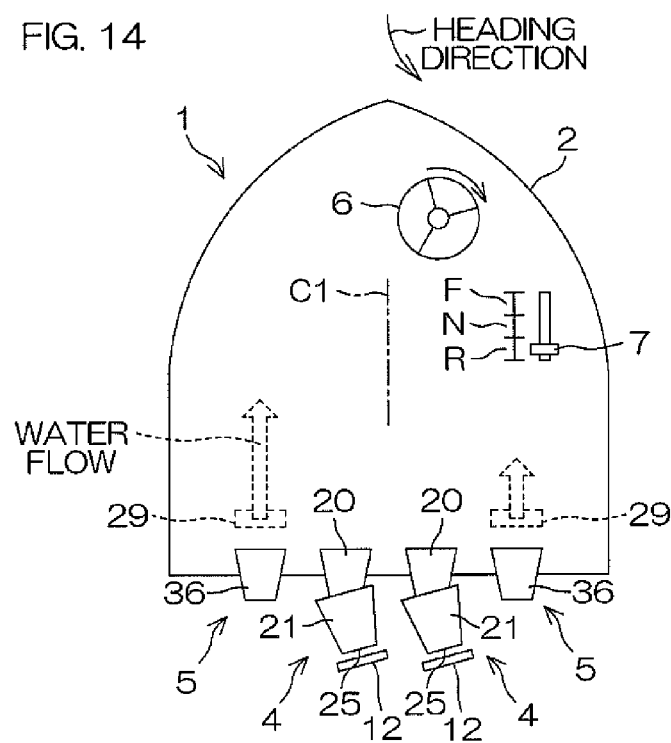

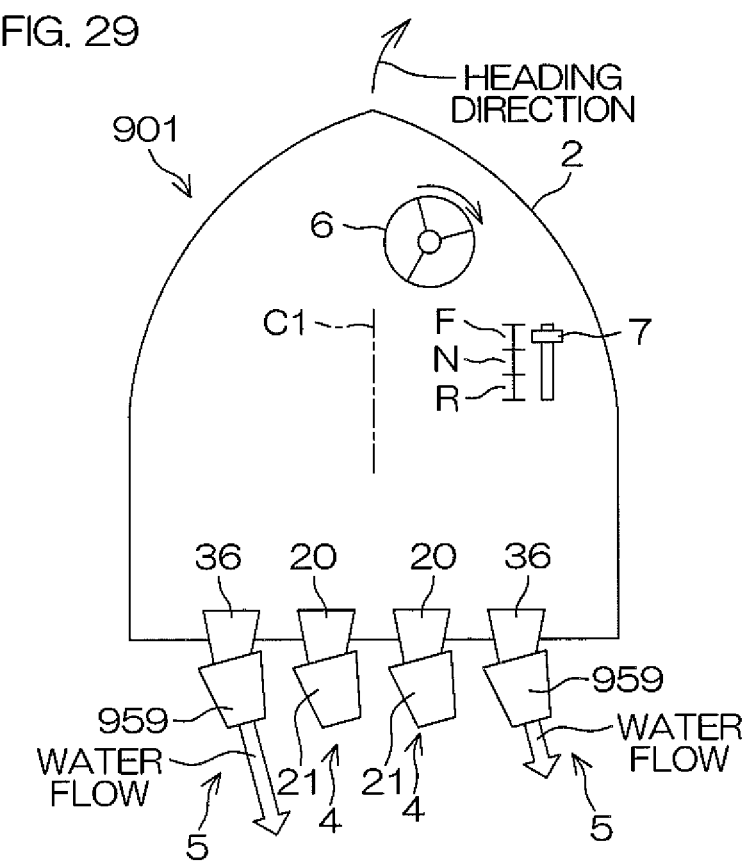

VESSEL

BACKGROUND OF THE INVENTION

1. Field of the Invention

The present invention relates to a vessel.

2. Description of the Related Art

Recently, vessels are being proposed that use not only an internal combustion engine but also an electric motor as a drive source to reduce hazardous substances contained in exhaust gas discharged from the internal combustion engine, improve fuel consumption, and reduce noise.

For example, a conventional vessel described in U.S. Pat. No. 6,857,918 B1 includes an engine (internal combustion engine), an electric motor, and a jet pump driven by the engine and the electric motor. The electric motor is disposed between the jet pump and the engine. A first end portion of an output shaft of the electric motor projects to the jet pump side and a second end portion of the output shaft of the electric motor projects to the engine side. The first end portion of the output shaft is connected to a drive shaft of the jet pump and the second end portion of the output shaft is connected to a clutch. A crankshaft of the engine is connected to the clutch. Rotation of the electric motor is transmitted from the output shaft to the driveshaft. Rotation of the engine is transmitted via the output shaft of the electric motor to the drive shaft of the jet pump in a state in which the output shaft and the crankshaft are connected by the clutch.

SUMMARY OF THE INVENTION

The inventor of preferred embodiments of the present invention described and claimed in the present application conducted an extensive study and research regarding a vessel, such as the one described above, and in doing so, discovered and first recognized new unique challenges and previously unrecognized possibilities for improvements as described in greater detail below.

Specifically, to use the internal combustion engine and the electric motor in combination, for example, addition of an electric motor to a vessel that includes a conventional internal combustion engine may be considered. If in this case, the structure described in U.S. Pat. No. 6,857,918 B1 is adopted, not just the electric motor but a clutch and an arrangement for performing switching of the clutch must be provided anew. The vessel thus becomes complex in structure and the existing structure related to the internal combustion engine must also be changed greatly.

In order to overcome the previously unrecognized and unsolved challenges described above, a preferred embodiment of the present invention provides a vessel that includes a first propulsion mechanism, at least one second propulsion mechanism, and a hull. The first propulsion mechanism includes an internal combustion engine and is arranged to generate thrust by the internal combustion engine. The at least one second propulsion mechanism includes an electric motor and a second jet pump driven by the electric motor and is arranged to generate thrust by the second jet pump being driven by the electric motor. The first propulsion mechanism and the at least one second propulsion mechanism are mutually independent. Further, the first propulsion mechanism and the at least one second propulsion mechanism are disposed in the hull such that a direction of the thrust generated by the first propulsion mechanism and a direction of the thrust generated by the at least one second propulsion mechanism are the same.

The vessel may further include a steering handle to steer the vessel. In this case, the direction of the thrust generated by the first propulsion mechanism and the direction of the thrust generated by the at least one second propulsion mechanism may be matched in a state in which the steering handle is positioned at a straight drive position at which the vessel is driven straight (driven straight forward or in reverse). That is, the direction in which the first propulsion mechanism propels the hull when the steering handle is at the straight drive position may be matched with the direction in which the at least one second propulsion mechanism propels the hull when the steering handle is at the straight drive position.

With this arrangement of the present preferred embodiment of the present invention, the first propulsion mechanism generates thrust by the internal combustion engine, and the second propulsion mechanism generates thrust by the electric motor. The vessel is thereby propelled. The direction of the thrust generated by the first propulsion mechanism and the direction of the thrust generated by the at least one second propulsion mechanism are matched. The vessel can thus be propelled in the same direction by either of the first propulsion mechanism and the second propulsion mechanism. Further, the first propulsion mechanism and the second propulsion mechanism are mutually independent. Thus, by adding the second propulsion mechanism to a conventional vessel that includes an internal combustion engine, the vessel can be propelled by the two types of drive sources including the internal combustion engine and the electric motor without making a significant change in an existing structure of the internal combustion engine.

The first propulsion mechanism may include a plurality of first blades and a first rotating shaft that is driven to rotate together with the plurality of first blades by the internal combustion engine. The at least one second propulsion mechanism may include a plurality of second blades and a second rotating shaft that is independent of the first rotating shaft and is driven to rotate together with the plurality of second blades by the electric motor. The first blades may be blades of an impeller or may be blades of a propeller.

Also, the first rotating shaft and the second rotating shaft may be disposed in parallel or substantially in parallel.

Also, the first propulsion mechanism may further include a first jet pump driven by the internal combustion engine and may be arranged to generate thrust by the first jet pump being driven by the internal combustion engine.

Also, the at least one second propulsion mechanism may include a pair of second propulsion mechanisms disposed at respective sides of a central portion of the hull in regard to a width direction of the hull. In this case, the vessel may further include a thrust controller programmed to control the pair of second propulsion mechanisms such that a magnitude of the thrust from one of the pair of second propulsion mechanisms differs from a magnitude of the thrust from the other of the pair of second propulsion mechanisms.

Also, the at least one second propulsion mechanism may include a pair of second propulsion mechanisms disposed at respective sides of the central portion of the hull in regard to the width direction of the hull. In this case, the first propulsion mechanism may be disposed at the central portion of the hull in regard to the width direction of the hull.

Also, the first propulsion mechanism may be disposed at the central portion of the hull in regard to the width direction of the hull and the at least one second propulsion mechanism may be adjacent to the first propulsion mechanism.

Also, the at least one second propulsion mechanism may be disposed at the central portion of the hull in regard to the width direction of the hull.

Also, the electric motor may be arranged to be capable of forward rotation and reverse rotation. In this case, the second jet pump may include an outlet and be arranged to jet water from the outlet in accordance with forward rotation of the electric motor and suck in water from the outlet in accordance with reverse rotation of the electric motor.

Also, the vessel may further include a switching controller programmed to control the first propulsion mechanism and the at least one second propulsion mechanism. In this case, the switching controller may be programmed to switch between the first propulsion mechanism and the at least one second propulsion mechanism in accordance with speed regions of the vessel.

Specifically, the switching controller may be programmed such that in a low speed region in which a speed of the vessel is less than a predetermined first speed, the vessel is propelled by the at least one second propulsion mechanism.

Also, the switching controller may be programmed such that in a high speed region in which the speed of the vessel is not less than a predetermined second speed that is not less than the first speed, the vessel is propelled by the first propulsion mechanism.

Also, the switching controller may be programmed such that in a medium speed region in which the speed of the vessel is not less than the first speed and less than the second speed, the vessel is propelled by the first propulsion mechanism and the at least one second propulsion mechanism.

Also, the switching controller may be programmed to control the first propulsion mechanism such that in the medium speed region, the thrust of the first propulsion mechanism increases in accordance with an increase in the speed of the vessel. In this case, the switching controller may be programmed to control the at least one second propulsion mechanism such that in the medium speed region, the thrust of the at least one second propulsion mechanism decreases in accordance with the increase in the speed of the vessel.

Also, the hull may include a bottom portion with a V-shaped configuration from a rearward view. The bottom portion may include a central portion that is positioned at a lowest position when the hull is viewed from the rear. In this case, the first propulsion mechanism and the at least one second propulsion mechanism may be disposed at the bottom portion. Further, a distance in the width direction of the hull from the central portion to the at least one second propulsion mechanism may be greater than a distance in the width direction of the hull from the central portion to the first propulsion mechanism.

Also, the electric motor may be arranged to generate electric power by being driven to rotate by a water flow flowing into the at least one second propulsion mechanism when the vessel is being propelled by just the first propulsion mechanism. In this case, the vessel may further include a battery connected to the electric motor and arranged to be charged by the electric power generated by the electric motor.

Another preferred embodiment of the present invention provides a vessel that includes a first propulsion mechanism, at least one second propulsion mechanism, and a hull. The first propulsion mechanism includes an internal combustion engine and a first jet pump driven by the internal combustion engine and is arranged to generate thrust by the first jet pump being driven by the internal combustion engine. The at least one second propulsion mechanism includes an electric motor and is arranged to generate thrust by the electric motor. The second propulsion mechanism may be a jet propulsion mechanism that includes a jet pump driven by the electric motor or may be a propeller propulsion mechanism that includes a propeller driven by the electric motor. The first propulsion mechanism and the at least one second propulsion mechanism are mutually independent. Further, the first propulsion mechanism and the at least one second propulsion mechanism are disposed in the hull such that a direction of the thrust generated by the first propulsion mechanism and a direction of the thrust generated by the at least one second propulsion mechanism are matched.

With this arrangement of the present preferred embodiment of the present invention, the vessel can be propelled by the two types of drive source of the internal combustion engine and the electric motor without making a significant change in an existing structure related to the internal combustion engine because the first propulsion mechanism and the second propulsion mechanism are mutually independent.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 9 is a schematic plan view for explaining the thrust directions when the pair of first propulsion mechanisms drive the vessel in reverse.

FIG. 10 is a schematic plan view for explaining the thrust directions when the pair of first propulsion mechanisms make the vessel turn while driving it in reverse.

FIG. 13 is a schematic plan view for explaining the thrust directions when the pair of second propulsion mechanisms drive the vessel in reverse.

FIG. 14 is a schematic plan view for explaining the thrust directions when the pair of second propulsion mechanisms make the vessel turn while driving it in reverse.

FIG. 29 is a plan view for explaining the arrangement of the vessel according to a tenth preferred embodiment of the present invention.

DETAILED DESCRIPTION OF THE PREFERRED EMBODIMENTS

Figure 1:
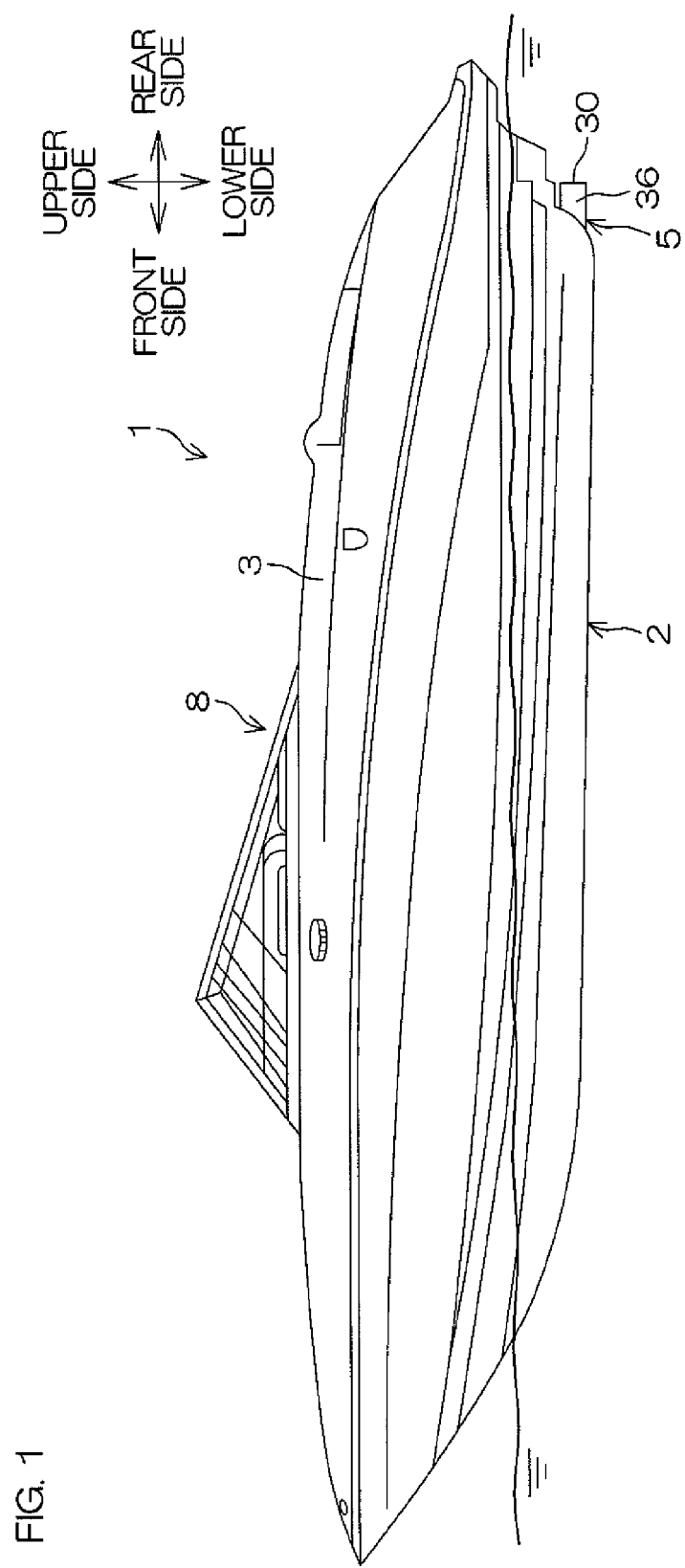
FIG. 1 is a side view for explaining an arrangement of the vessel according to a first preferred embodiment of the present invention.
Figure 2:
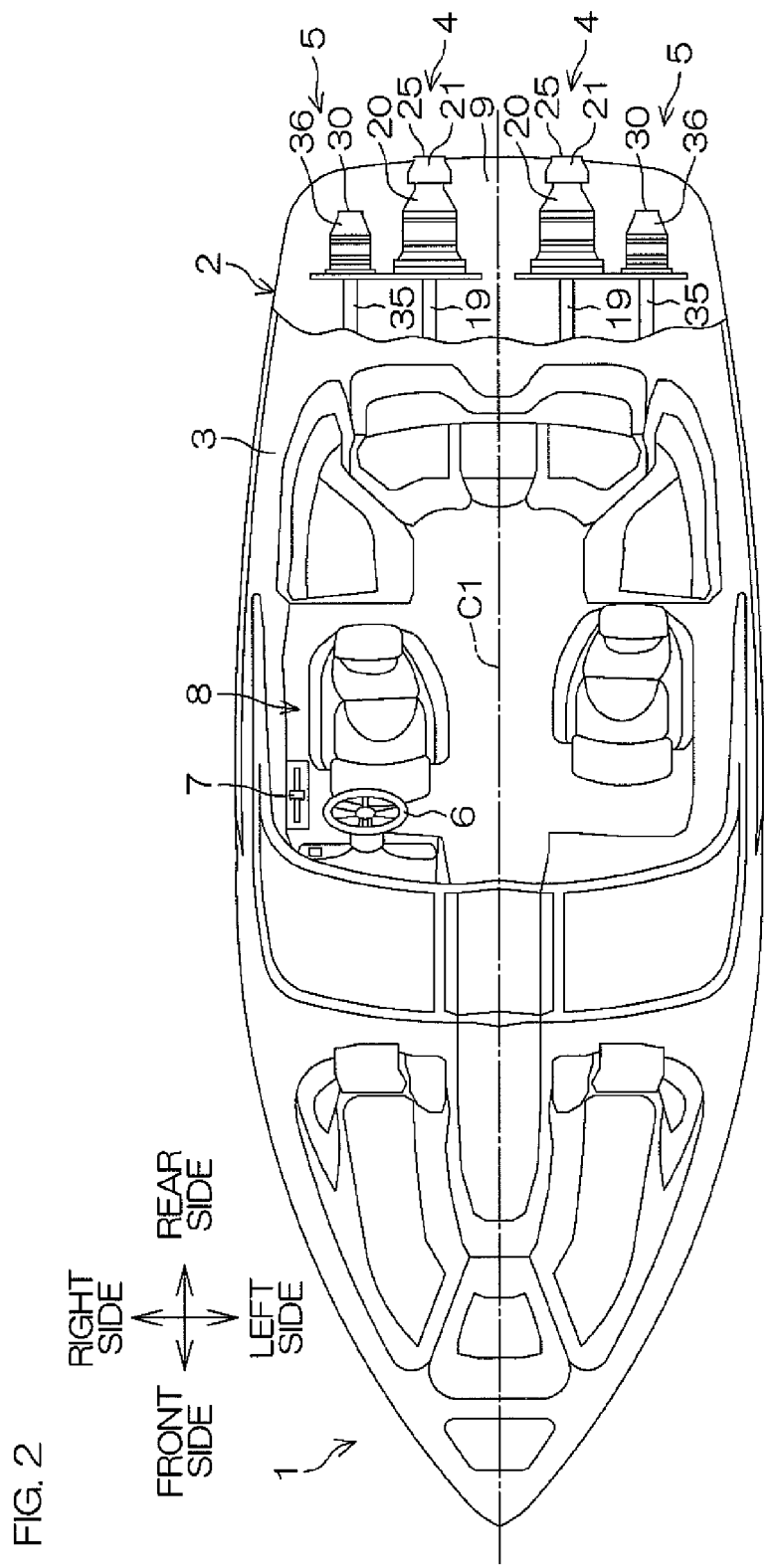
FIG. 2 is a plan view for explaining the arrangement of the vessel according to the first preferred embodiment of the present invention.

In the following drawings, a vessel 1 is illustrated in a stationary state in which the vessel 1 is stationary on water. In the following description, "front/rear direction," "right/left direction (width direction)," and "up/down direction" are directions based on a hull 2 in the stationary state.
First Preferred Embodiment FIG. 1 is a side view for explaining an arrangement of the vessel 1 according to a first preferred embodiment of the present invention. FIG. 2 is a plan view for explaining the arrangement of the vessel 1 according to the first preferred embodiment of the present invention. In FIG. 2, a portion of the vessel 1 is broken away to illustrate an interior of the vessel 1.

As shown in FIG. 1, the vessel 1 includes a hull 2 and a deck 3 disposed above the hull 2. As shown in FIG. 2, the vessel 1 further includes a plurality of propulsion mechanisms 4 and 5 that generate thrust, a steering handle 6 operated by a vessel operator to steer the vessel 1, and a lever 7 operated by the vessel operator to perform speed adjustment and switching of heading direction of the vessel 1. The steering handle 6 and the lever 7 are disposed near an operator seat 8 provided on the deck 3. The plurality of propulsion mechanisms 4 and 5 are mounted to a rear portion of the hull 2. Each of the second propulsion mechanisms 4 and 5 is arranged to propel the vessel 1 forward and in reverse. The plurality of propulsion mechanisms 4 and 5 include a pair of first propulsion mechanisms 4, each generating thrust by an engine 10 (see FIG. 3) as a drive source, and a pair of second propulsion mechanisms 5, each generating thrust by an electric motor 27 (see FIG. 4) as a drive source. The first propulsion mechanisms 4 and the second propulsion mechanisms 5 are mutually independent.

As shown in FIG. 2, the pair of first propulsion mechanisms 4 are disposed at a central portion 9 of the hull 2 in regard to a width direction of the hull 2. Specifically, the first propulsion mechanisms 4 include first nozzles 20 that jet water toward a rear of the hull 2. The two first nozzles 20 are disposed right/left symmetrically at the central portion 9 of the hull 2. That is, the two first nozzles 20 are disposed symmetrically with respect to a vertical plane (hull center C1) that passes through centers of a stem and a stern. The pair of first propulsion mechanisms 4 are thus disposed right/left symmetrically at the central portion 9 of the hull 2. Also, the propulsion mechanisms 5 include second nozzles 36 that jet water to the rear of the hull 2. The two second nozzles 36 are disposed right/left symmetrically at respective sides of the two first nozzles 20. The pair of second propulsion mechanisms 5 are thus disposed right/left symmetrically at respective sides of the central portion 9 of the hull 2 in regard to the width direction of the hull 2. Put another way, the pair of second propulsion mechanisms 5 are disposed further to the sides than the pair of first propulsion mechanisms 4.

Figure 3:
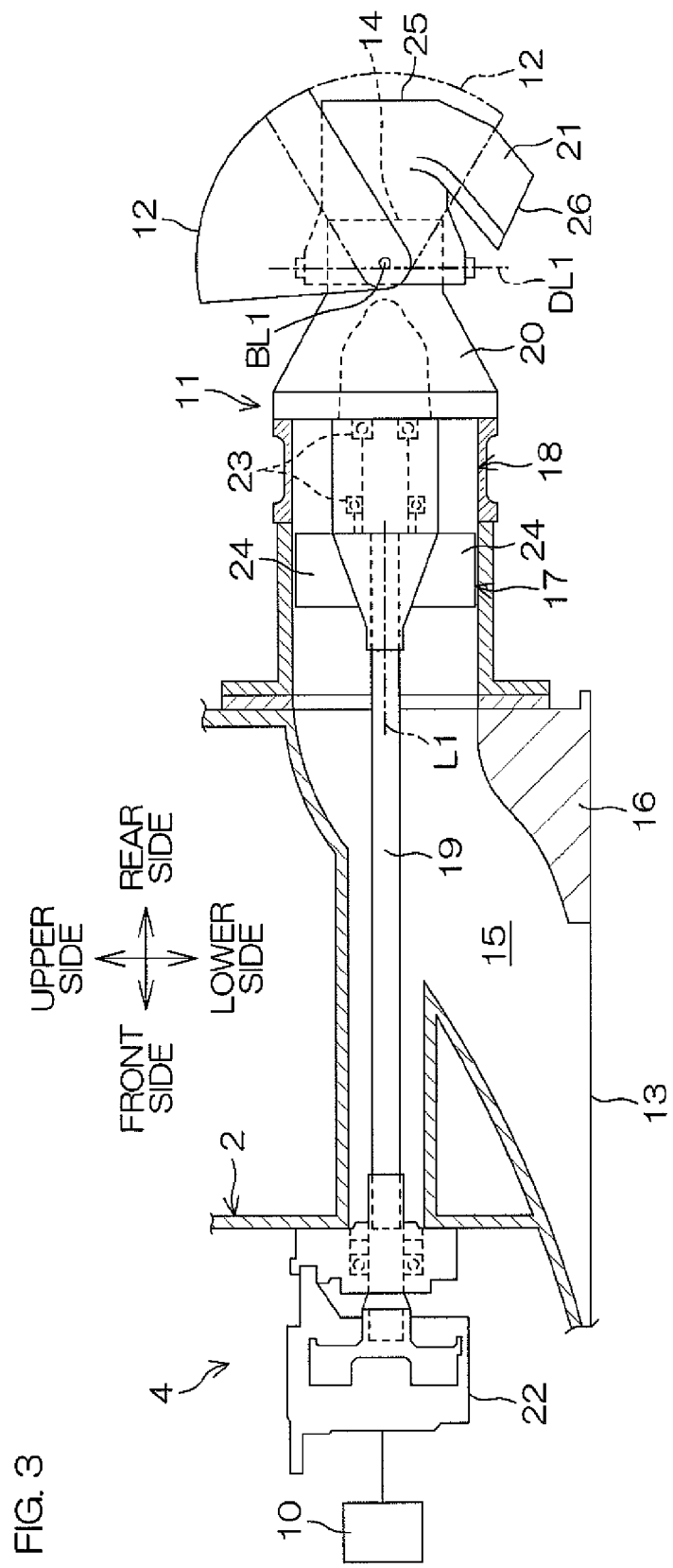
FIG. 3 is a partial sectional view for explaining an arrangement of a first propulsion mechanism according to the first preferred embodiment of the present invention.

FIG. 3 is a partial sectional view for explaining an arrangement of a first propulsion mechanism 4 according to the first preferred embodiment of the present invention.

The first propulsion mechanism 4 includes an engine 10, a first jet pump 11, and a first bucket 12. The engine 10 is an internal combustion engine. The engine 10 is disposed in an interior of the hull 2. The first jet pump 11 is disposed at the rear of the engine 10. The first bucket 12 is mounted to a rear end portion of the first jet pump 11. The first jet pump 11 is driven by the engine 10. The first jet pump 11 is arranged to suck in water from a hull bottom and jet the sucked-in water to the rear by being driven by the engine 10. The first bucket 12 is arranged to convert the direction of the jetted water from the first jet pump 11 to a forward direction.

The first jet pump 11 defines a first inlet 13 opening to the hull bottom, a first outlet 14 opening rearward further to the rear than the first inlet 13, and a first flow passage 15 connecting the first inlet 13 and the first outlet 14. The first jet pump 11 includes a first duct 16 defining the first inlet 13 and a portion of the first flow passage 15, a first impeller 17 and a first stationary vane 18 disposed in the first flow passage 15, and a first drive shaft 19 coupled to the first impeller 17. Further, the first jet pump 11 includes a first nozzle 20 defining the first outlet 14, a first deflector 21 converting the direction of the jetted water from the first nozzle 20 to the right and left, and a first screen (not shown) mounted to the first duct 16. Entry of foreign substances into the first inlet 13 is prevented by the first grid.

The first drive shaft 19 extends in the front/rear direction. A front end portion of the first drive shaft 19 is coupled to the engine 10 via a coupling 22, and a rear end portion of the first drive shaft 19 is rotatably supported via a plurality of bearings 23. The first impeller 17 is coupled to the first drive shaft 19 at the front relative to the rear end portion of the first drive shaft 19. The first stationary vane 18 is disposed at the rear of the first impeller 17 and the first nozzle 20 is disposed at the rear of the first stationary vane 18. The first impeller 17 includes a plurality of first blades 24 (rotor vane) that are disposed so as to surround a first rotation axis L1 (central axis of the first drive shaft 19). Likewise, the first stationary vane 18 includes a plurality of blades disposed so as to surround the first rotation axis L1. The first impeller 17 is rotatable about the first rotation axis L1 with respect to the first flow passage 15 and the first stationary vane 18 is fixed with respect to the first flow pas sage 15.

The first impeller 17 is driven by the engine 10 to rotate about the first rotation axis L1 together with the first drive shaft 19. When the first impeller 17 is driven to rotate, water is sucked into the first flow passage 15 from the first inlet 13 and the water sucked into the first flow passage 15 is delivered to the first stator vane 18 from the first impeller 17. By the water delivered by the first impeller 17 being passed through the first stationary vane 18, water flow twisting due to rotation of the first impeller 17 is reduced and the water flow is rectified. The rectified water is thus delivered from the first stationary vane 18 to the first outlet 14. The first nozzle 20 has a cylindrical form extending in the front/rear direction and is arranged such that an inner diameter of a rear end portion is less than an inner diameter of a front end portion. The first outlet 14 is defined by the rear end portion of the first nozzle 20. The water delivered into the first nozzle 20 is thus jetted rearward from the first outlet 14 after being accelerated by the first nozzle 20.

The first deflector 21 is coupled to the first nozzle 20. The first deflector 21 is hollow. The first outlet 14 is disposed inside the first deflector 21. The first deflector 21 defines a forward drive outlet 25 that is opened rearward and a reverse drive outlet 26 that is opened obliquely forward. The forward drive outlet 25 is disposed at the rear of the first outlet 14 and the reverse drive outlet 26 is disposed below the forward drive outlet 25. The first bucket 12 is coupled to the first deflector 21 in a manner enabling rotation about a bucket rotation axis BL1 that extends in the right/left direction. The first bucket 12 is movable between a reverse drive position (position indicated by alternate long and two short dashed lines) at which the first bucket 12 covers the forward drive outlet 25 when the forward drive outlet 25 is viewed from the rear, and a forward drive position (position indicated by solid lines) at which the first bucket 12 does not cover the forward drive outlet 25 when the forward drive outlet 25 is viewed from the rear. The first bucket 12 is positioned at the forward drive position or the reverse drive position by operation of the lever 7 by the vessel operator.

In a state in which the first bucket 12 is positioned at the forward drive position, the forward drive outlet 25 is not covered so that the water jetted from the first outlet 14 passes through the interior of the first deflector 21 and is jetted rearward from the forward drive outlet 25. A thrust in a forward drive direction is thereby generated. On the other hand, in a state in which the first bucket 12 is positioned at the reverse drive position, the forward drive outlet 25 is covered and the water jetted from the first outlet 14 is jetted forward from the reverse drive outlet 26 without being jetted from the forward drive outlet 25. A thrust in a reverse drive direction is thereby generated. Thus, the vessel 1 is propelled forward in the state in which the first bucket 12 is positioned at the forward drive position and the vessel 1 is propelled rearward in the state in which the first bucket 12 is positioned at the reverse drive position.

The first deflector 21 is coupled to the first nozzle 20 in a manner enabling rotation to the right and left about a deflector rotation axis DL1 that extends in the up/down direction. The first deflector 21 rotates to the right and left about the deflector rotation axis DL1 together with the first bucket 12 in accordance with operation of the steering handle 6 by the vessel operator. When in the state in which the first bucket 12 is positioned at the forward drive position, the first deflector 21 rotates to the right or left about the deflector rotation axis DL1, the jetting direction of the water jetted from the forward drive outlet 25 is changed to the right or left. Likewise, when in the state in which the first bucket 12 is positioned at the reverse drive position, the first deflector 21 rotates to the right or left about the deflector rotation axis DL1, the jetting direction of the water jetted from the reverse drive outlet 26 is changed to the right or left. The first deflector 21 is thus arranged to change the water jetting direction to the right and left in accordance with the operation of the steering handle 6. The vessel 1 is turned by the direction of jetting of water from the first deflector 21 being inclined to the right or left with respect to the front/rear direction.

Figure 4:
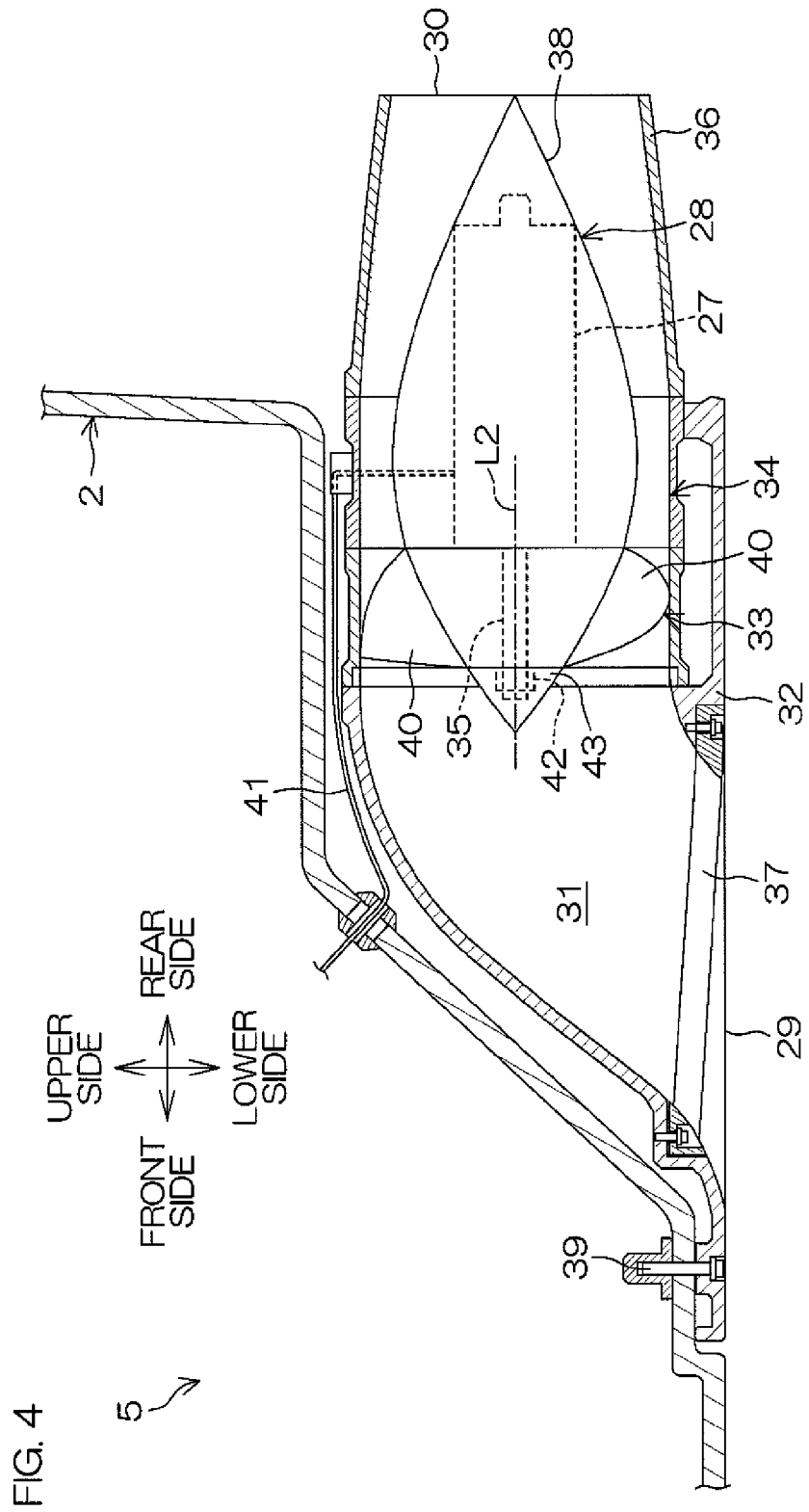
FIG. 4 is a partial sectional view for explaining an arrangement of a second propulsion mechanism according to the first preferred embodiment of the present invention.

FIG. 4 is a partial sectional view for explaining an arrangement of a second propulsion mechanism 5 according to the first preferred embodiment of the present invention.

The second propulsion mechanism 5 includes an electric motor 27 and a second jet pump 28. The electric motor 27 is, for example, a brushless motor. The second jet pump 28 is driven by the electric motor 27. By being driven by the electric motor 27, the second jet pump 28 sucks in water from the hull bottom and jets the sucked-in water to the rear. The second jet pump 28 defines a second inlet 29 opening to the hull bottom, a second outlet 30 opening rearward further to the rear than the second inlet 29, and a second flow passage 31 connecting the second inlet 29 and the second outlet 30. The second jet pump 28 includes a second duct 32 defining the second inlet 29 and a portion of the second flow passage 31, a second impeller 33 and a second stationary vane 34 disposed in the second flow passage 31, and a second drive shaft 35 coupled to the second impeller 33. Further, the second jet pump 28 includes a second nozzle 36 defining the second outlet 30, a second screen 37 mounted to the second duct 32, and a second housing 38 disposed in the second flow passage 31. Entry of foreign substances into the second inlet 29 is prevented by the second screen 37.

The second jet pump 28 is mounted to the hull 2, for example, by a bolt 39. The electric motor 27 is held by the second jet pump 28. Specifically, the electric motor 27 is held by the second housing 38 in its interior. The second housing 38 is disposed at the rear of the second impeller 33. The second stationary vane 34 is disposed at a periphery of the second housing 38, and the second nozzle 36 surrounds the second housing 38 at the rear of the second stationary vane 34. The second impeller 33 includes a plurality of second blades 40 (rotary vanes) disposed so as to surround a second rotation axis L2 (central axis of the second drive shaft 35). Likewise, the second stationary vane 34 includes a plurality of blades disposed so as to surround the second rotation axis L2. The second impeller 33 is rotatable about the second rotation axis L2 with respect to the second flow passage 31 and the second stationary vane 34 is fixed with respect to the second flow passage 31.

A wiring 41 extending from the interior of the hull 2 to an exterior of the hull 2 passes through interiors of the second stationary vane 34 and the second housing 38 and is connected to the electric motor 27. Electric power of a battery 52 to be described later is supplied to the electric motor 27 via the wiring 41. The electric motor 27 generates motive power by conversion of electrical energy to mechanical energy and generates electricity by conversion of mechanical energy to electrical energy. The second drive shaft 35 extends in the front/rear direction at the front of the electric motor 27. The second drive shaft 35 may be a rotating shaft of the electric motor 27 or may be shaft that is coaxially coupled with a rotating shaft of the electric motor 27. The second drive shaft 35 is independent of the first drive shaft 19 of the first propulsion mechanism 4, and the first drive shaft 19 and the second drive shaft 35 are disposed in parallel or substantially in parallel (see FIG. 1). The second drive shaft 35 penetrates through the second impeller 33 in the front/rear direction. A front end portion of the second drive shaft 35 projects forward from the second impeller 33. A nut 42 is mounted to the front end portion of the second drive shaft 35. The front end portion of the second drive shaft 35 and the nut 42 are covered by a cap 43. The second impeller 33 is coupled to the second drive shaft 35 by the nut 42.

Together with the second drive shaft 35, the second impeller 33 is driven about the second rotation axis L2 by the electric motor 27. The electric motor 27 is arranged to be capable of forward rotation and reverse rotation. When the electric motor 27 rotates forward, the second impeller 33 is driven to rotate in a forward rotation direction. Water is thereby sucked into the second flow passage 31 from the second inlet 29 and the water sucked into the second flow passage 31 is delivered from the second impeller 33 to the second stationary vane 34. By the water delivered by the second impeller 33 being passed through the second stationary vane 34, water flow twisting due to rotation of the second impeller 33 is reduced and the water flow is rectified. The rectified water is thus delivered from the second stationary vane 34 to the second outlet 30. The second nozzle 36 has a cylindrical form extending in the front/rear direction and a rear end portion of the second nozzle 36 defines the second outlet 30. The water delivered into the second nozzle 36 is thus jetted rearward from the second outlet 30. That is, water is jetted rearward from the second outlet 30 in accordance with the forward rotation of the electric motor 27.

On the other hand, when the electric motor 27 rotates in reverse, the second impeller 33 is driven to rotate in a reverse rotation direction that is opposite the forward rotation direction. Water is thereby sucked into the second flow passage 31 from the second outlet 30, and the water sucked into the second flow passage 31 flows toward the second inlet 29. That is, water is sucked into the second outlet 30 in accordance with the reverse rotation of the electric motor 27. The second duct 32 is arranged to jet the water, flowing toward the second inlet 29, obliquely downward and forward from the second inlet 29. The water sucked in from the second outlet 30 is thus jetted obliquely downward and forward from the second inlet 29. A thrust in the reverse drive direction is thereby generated. That is, a thrust in the forward drive direction is generated when the second impeller 33 is driven to rotate in the forward rotation direction, and the thrust in the reverse drive direction is generated when the second impeller 33 is driven to rotate in the reverse rotation direction. The second propulsion mechanism 5 is thus arranged such that the direction of thrust can be changed by switching the rotation direction of the second impeller 33.

Figure 5:
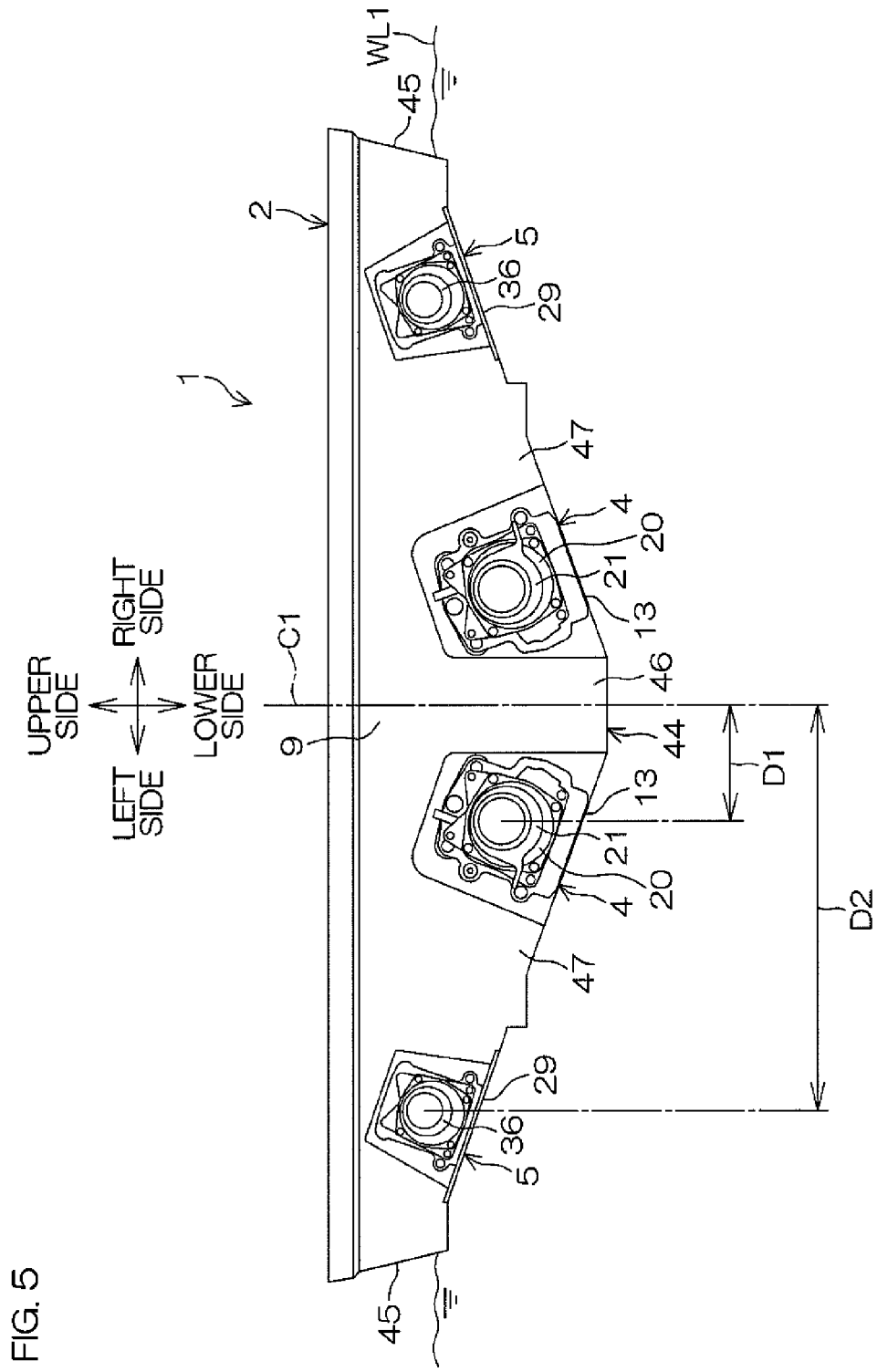
FIG. 5 is a rear view for explaining the arrangement of the vessel according to the first preferred embodiment of the present invention.

FIG. 5 is a rear view for explaining the arrangement of the vessel 1 according to the first preferred embodiment of the present invention.

The hull 2 includes a bottom portion 44 and a pair of right and left side portions 45 extending from a right end portion and a left end portion of the bottom portion 44. The bottom portion 44 preferably has, for example, a V-shaped configuration that is right/left symmetrical when viewed from the rear. The bottom portion 44 thus includes a central portion 46 (keel) that is positioned lowest when the hull 2 is viewed from the rear and a pair of right and left inclining portions 47 extending from the central portion 46 to the side portions 45. Each inclining portion 47 is inclined such that an outer end portion (chine) is positioned above an inner end portion. The central portion 46 of the bottom portion 44 is thus disposed below the outer end portions of the inclining portions 47. In a gliding state in which the vessel 1 glides forward, a waterline WL1 is positioned at substantially the same height as the chines. Thus, in the gliding state, a water depth to the central portion 46 is greater than a water depth at the chines.

The first propulsion mechanisms 4 and the second propulsion mechanisms 5 are disposed at the bottom portion 44. The pair of first propulsion mechanisms 4 are disposed at respective sides of the hull center C1 and the pair of second propulsion mechanisms 5 are disposed at respective sides of the hull center C1 further to the sides than the pair of first propulsion mechanisms 4. A distance D2 in the width direction from the hull center C1 to each second propulsion mechanism 5 is longer than a distance D1 in the width direction from the hull center C1 to each first propulsion mechanism 4. The bottom portion 44 preferably has a V-shaped configuration from a rearward view and the first propulsion mechanisms 4 and the second propulsion mechanisms 5 are disposed at the bottom portion 44, and thus the longer the distances (distances in the width direction) from the hull center 1, the higher upward the inlets 13 and 29 are positioned. Water pressure applied to the second inlet 29 of each second propulsion mechanism 5 is thus less than water pressure applied to the first inlet 13 of each first propulsion mechanism 4.

Figure 6:
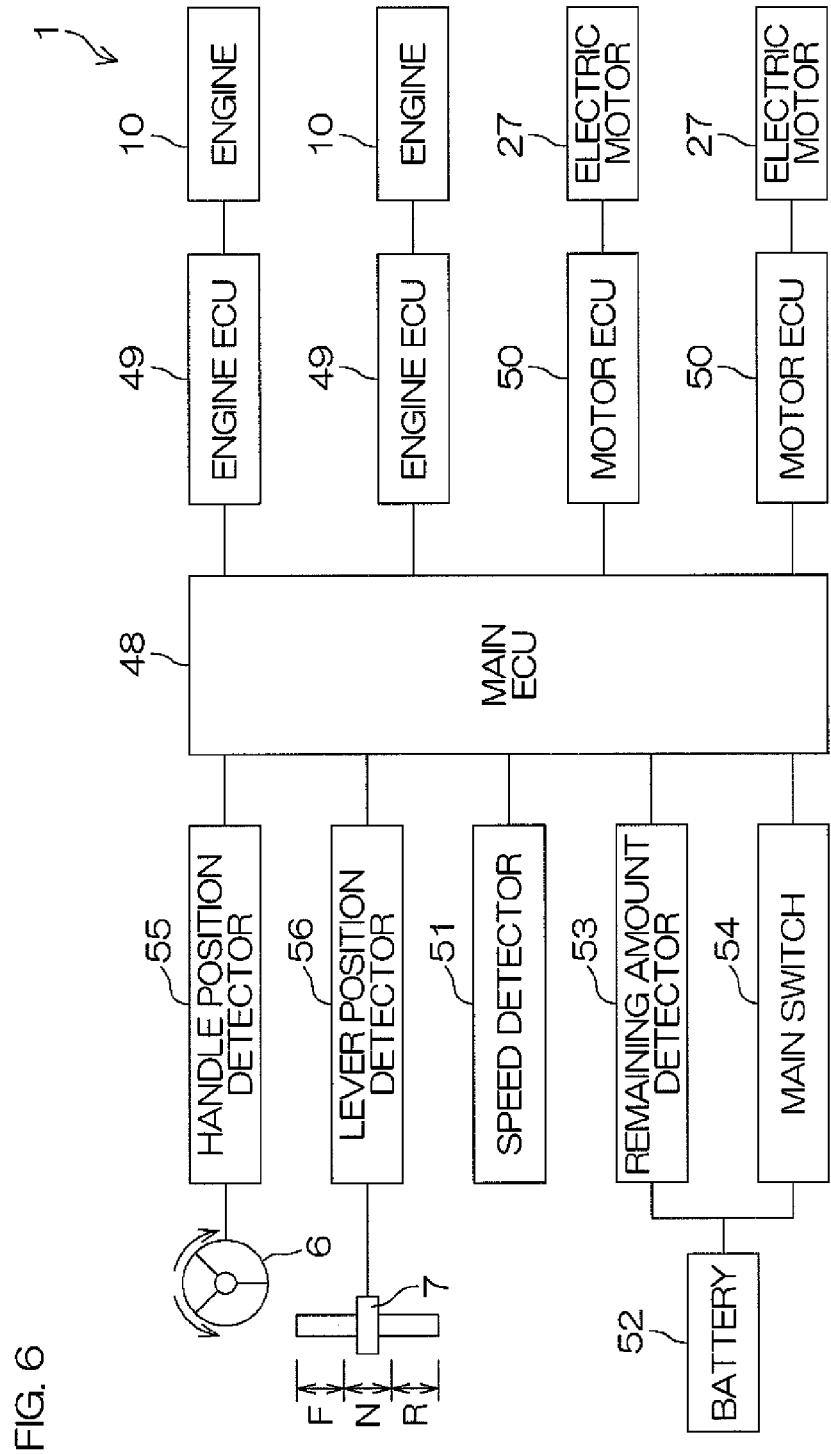
FIG. 6 is a diagram for explaining an electrical arrangement of the vessel according to the first preferred embodiment of the present invention.

FIG. 6 is a diagram for explaining an electrical arrangement of the vessel 1 according to the first preferred embodiment of the present invention.

The vessel 1 further includes a main ECU (electronic control unit) programmed to control running of the vessel 1. Also, each first propulsion mechanism 4 further includes an engine ECU 49, and each second propulsion mechanism 5 further includes a motor ECU 50. The main ECU 48 is an example of a thrust controller and a switching controller according to the first preferred embodiment of the present invention. The engine ECUs 49 and the motor ECUs 50 are electrically connected to the main ECU 48. The main ECU 48 is programmed to control the engine ECUs 49 and the motor ECUs 50. The two engine ECUs 49 are programmed to respectively control the two engines 10, and the two motor ECUs 50 are programmed to respectively control the two electric motors 27.

The vessel 1 further includes a speed detector 51 detecting a speed of the vessel 1, the battery 52 supplying electric power to the vessel 1, a remaining amount detector 53 detecting a remaining amount of the electric power of the battery 52, and a main switch 54 that is operated by the vessel operator to start up the vessel 1. When the main switch 54 is turned on, the electric power of the battery 52 is supplied to the main ECU 48, the motor ECUs 50, and other electrical equipments included in the vessel 1, and when the main switch 54 is turned off, the supply of electric power to the electrical equipments is stopped. The vessel 1 further includes a handle position detector 55 detecting a steering position of the steering handle 6 and a lever position detector 56 detecting a shift position of the lever 7. The handle position detector 55 and the lever position detector 56 are electrically connected to the main ECU 48.

The steering handle 6 is movable between a maximum left steering position and a maximum right steering position. The steering handle 6 is positioned, by operation of the vessel operator, at any position between the maximum left steering position and the maximum right steering position. A straight drive position (position shown in FIG. 6) is provided between the maximum left steering position and the maximum right steering position. The straight drive position is the position at which the steering handle 6 is positioned when the vessel 1 is to be driven straight forward or in reverse. The first deflector 21 (see FIG. 3) is rotated to the right and left in linkage with the steering handle 6. In a state in which the steering handle 6 is positioned in a region at the maximum left steering position side of the straight drive position, the first deflector 21 is inclined to the left. On the other hand, in a state in which the steering handle 6 is positioned in a region at the maximum right steering position side of the straight drive position, the first deflector 21 is inclined to the right.

Also, the lever 7 is movable to an F region, an N region, and an R region. The N region is provided between the F region and the R region. The lever 7 is positioned, by operation by the vessel operator, at any position within the F region, N region, and R region. The F region is the region in which the lever 7 is positioned when the vessel 1 is to be driven forward, and the R region is the region in which the lever 7 is positioned when the vessel 1 is to be driven in reverse. In a state in which the lever 7 is positioned in the F region, the first bucket 12 (see FIG. 3) is positioned at the forward drive position, and in a state in which the lever 7 is positioned in the R region, the first bucket 12 is positioned at the reverse drive position. For example, when the vessel operator moves the lever 7 from the F region to the R region, the first bucket 12 moves from the forward drive position to the reverse drive position.

The directions of thrusts generated by the first propulsion mechanisms 4 and the second propulsion mechanisms 5 shall now be described. First, the thrust directions when the pair of first propulsion mechanisms 4 propel the vessel 1 shall be described. Propulsion of the vessel 1 by the pair of first propulsion mechanisms 4 may be performed when the vessel 1 is running in any speed region.

Figure 7:
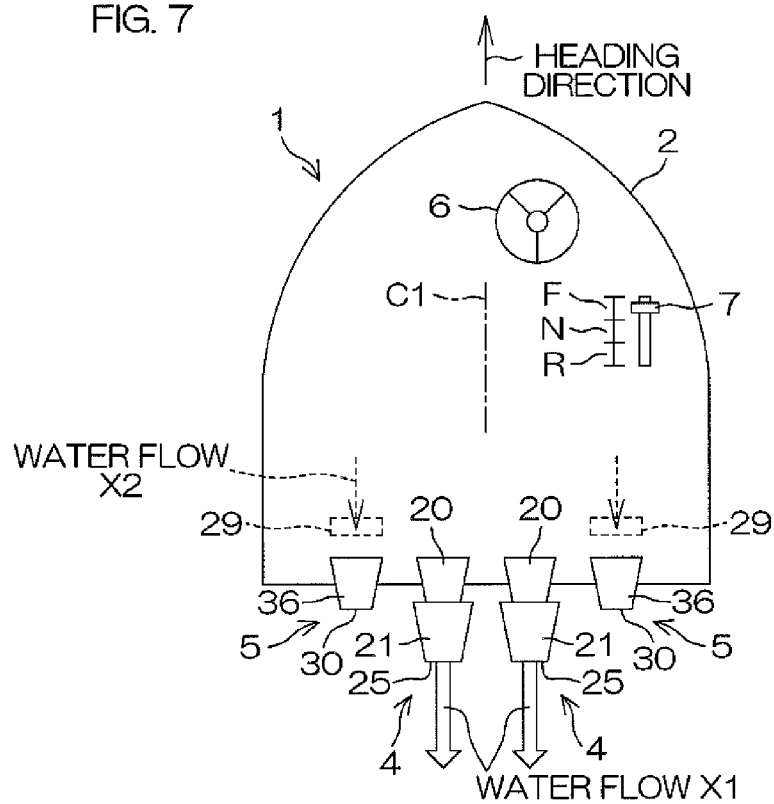
FIG. 7 is a schematic plan view for explaining the thrust directions when the pair of first propulsion mechanisms drive the vessel forward.

FIG. 7 is a schematic plan view for explaining the thrust directions when the pair of first propulsion mechanisms 4 drive the vessel 1 forward.

When the vessel operator makes the vessel 1 be driven straight forward, the steering handle 6 is positioned at the straight driving position and the lever 7 is positioned in the F region. The two first deflectors 21 are thus positioned such that the jetting directions of water from the forward drive outlets 25 are aligned with the front/rear direction in a plan view and the two first buckets 12 are positioned at the forward drive positions (positions of not covering the forward drive outlets 25). Further, a command from the main ECU 48 is input into the two engine ECUs 49, and the two engine ECUs 49 respectively control the two engines 10 such that magnitudes of outputs of the two engines 10 are matched. Water is thereby jetted from the two forward drive outlets 25 in directions aligned with the front/rear direction in a plan view. Also, water flows X1 are formed by the water being jetted rearward from the two forward drive outlets 25. Magnitudes of the thrusts generated by the respective first propulsion mechanisms 4 are matched because the magnitudes of the outputs of the two engines 10 are matched. Further, the pair of first propulsion mechanisms 4 are disposed right/left symmetrically. Thus, by water being jetted rearward from the two forward drive outlets 25, forces (thrusts generated by the pair of first propulsion mechanisms 4) in a forward direction (direction parallel or substantially parallel to the hull center C1) are applied to the hull 2 and the vessel 1 is driven straight forward without turning to the right or left.

In a state in which the vessel 1 is being propelled just by the first propulsion mechanisms 4, suction forces due to rotation of the second impellers 33 are not generated and thus water is not sucked into the second flow passages 31 from the second inlets 29. However, water pressures are applied to the second inlets 29 due to running of the vessel 1 and water enters from the second inlets 29 into the second flow passages 31 due to the water pressures. That is, water flows X2 entering the second flow passages 31 from the second inlets 29 are formed by the running of the vessel 1. The water that has entered the second flow passages 31 flows toward the second outlets 30. The water flowing toward the second outlets 30 apply pressures (water pressures) to the second impellers 33 and rotate the second impellers 33. The rotations of the second impeller 33 are transmitted via the second drive shafts 35 to the electric motors 27. The electric motors 27 are thereby driven to rotate and the electric motors 27 generate electric power. The battery 52 is connected to the electric motors 27 via the wirings 41. The electric power generated by the electric motors 27 is thus supplied to the battery 52 and the battery 52 is charged. Thus, when the vessel 1 is being propelled by the pair of first propulsion mechanisms 4 in the state in which the pair of second propulsion mechanisms 5 are not generating thrusts, the electric motor 27 generates electricity and the battery 52 is charged.

Figure 8:
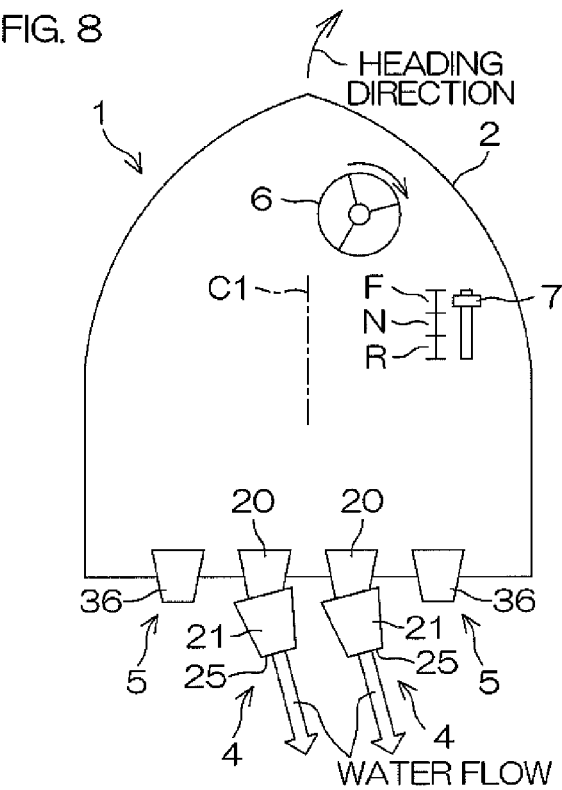
FIG. 8 is a schematic plan view for explaining the thrust directions when the pair of first propulsion mechanisms make the vessel turn while driving it forward.

FIG. 8 is a schematic plan view for explaining the thrust directions when the pair of first propulsion mechanisms 4 make the vessel 1 turn while driving it forward.

When the vessel operator makes the vessel 1 turn while it is being driven forward, the steering handle 6 is steered (positioned at the maximum right steering position side or the maximum left steering position side relative to the straight driving position) and the lever 7 is positioned in the F region. The two first deflectors 21 are thus positioned such that the jetting directions of water from the forward drive outlets 25 are inclined to the right or left with respect to the front/rear direction in a plan view and the two first buckets 12 are positioned at the forward drive positions. Further, a command from the main ECU 48 is input into the two engine ECUs 49, and the two engine ECUs 49 respectively control the two engines 10 such that the magnitudes of the outputs of the two engines 10 are matched. Water is thereby jetted from the two forward drive outlets 25 in directions that are inclined with respect to the front/rear direction in a plan view. That is, by water being jetted rearward from the two forward drive outlets 25, forces (thrusts generated by the pair of first propulsion mechanisms 4) in forward drive directions that make the hull 2 turn are applied to the hull 2. The vessel 1 is thus driven forward while turning at an angle that is in accordance with the position of the steering handle 6.

FIG. 9 is a schematic plan view for explaining the thrust directions when the pair of first propulsion mechanisms 4 drive the vessel 1 in reverse.

When the vessel operator makes the vessel 1 be driven straight in reverse, the steering handle 6 is positioned at the straight driving position and the lever 7 is positioned in the R region. The two first deflectors 21 are thus positioned such that the jetting directions of water from the reverse drive outlets 26 are aligned with the front/rear direction in a plan view and the two first buckets 12 are positioned at the reverse drive positions (positions of covering the forward drive outlets 25). Further, a command from the main ECU 48 is input into the two engine ECUs 49, and the two engine ECUs 49 respectively control the two engines 10 such that the magnitudes of the outputs of the two engines 10 are matched. Water is thereby jetted from the two reverse drive outlets 26 in directions aligned with the front/rear direction in a plan view. The magnitudes of the thrusts generated by the respective first propulsion mechanisms 4 are matched because the magnitudes of the outputs of the two engines 10 are matched.

Further, the pair of first propulsion mechanisms 4 are disposed right/left symmetrically. Thus, by water being jetted forward from the two reverse drive outlets 26, forces (thrusts generated by the pair of first propulsion mechanisms 4) in a rearward direction (direction parallel or substantially parallel to the hull center C1) are applied to the hull 2 and the vessel 1 is driven straight in reverse without turning to the right or left.

FIG. 10 is a schematic plan view for explaining the thrust directions when the pair of first propulsion mechanisms 4 make the vessel 1 turn while driving it in reverse.

When the vessel operator makes the vessel 1 turn while it is being driven in reverse, the steering handle 6 is steered and the lever 7 is positioned in the R region. The two first deflectors 21 are thus positioned such that the jetting directions of water from the reverse drive outlets 26 are inclined to the right or left with respect to the front/rear direction in a plan view and the two first buckets 12 are positioned at the reverse drive positions. Further, a command from the main ECU 48 is input into the two engine ECUs 49, and the two engine ECUs 49 respectively control the two engines 10 such that the magnitudes of the outputs of the two engines 10 are matched. Water is thereby jetted from the two reverse drive outlets 26 in directions that are inclined with respect to the front/rear direction in a plan view. That is, by water being jetted forward from the two reverse drive outlets 26, forces (thrusts generated by the pair of first propulsion mechanisms 4) in reverse drive directions that make the hull 2 turn are applied to the hull 2. The vessel 1 is thus driven in reverse while turning at an angle that is in accordance with the position of the steering handle 6.

Next, the thrust directions when the pair of second propulsion mechanisms 5 propel the vessel 1 shall be described. Propulsion of the vessel 1 by the pair of second propulsion mechanisms 5 may be performed when the vessel 1 is running in any speed region.

Figure 11:
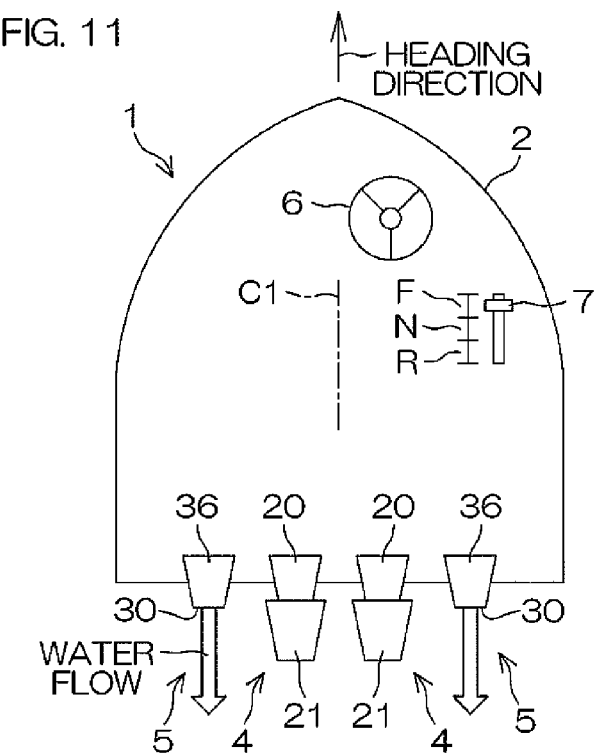
FIG. 11 is a schematic plan view for explaining the thrust directions when the pair of second propulsion mechanisms drive the vessel forward.

FIG. 11 is a schematic plan view for explaining the thrust directions when the pair of second propulsion mechanisms 5 drive the vessel 1 forward.

When the vessel operator makes the vessel 1 be driven straight forward, the steering handle 6 is positioned at the straight driving position and the lever 7 is positioned in the F region. In the state in which the steering handle 6 is positioned at the straight driving position and the lever 7 is positioned in the F region, a command from the main ECU 48 is input into the two motor ECUs 50, and the two motor ECUs 50 respectively control the two electric motors 27 such that the magnitudes of the outputs of the two electric motors 27 are matched. The two second impellers 33 are thereby driven to rotate in the forward rotation direction and water is jetted from the two second outlets 30 in directions aligned with the front/rear direction in a plan view. The magnitudes of the thrusts generated by the respective second propulsion mechanisms 5 are matched because the magnitudes of the outputs of the two electric motors 27 are matched. Further, the pair of second propulsion mechanisms 5 are disposed right/left symmetrically. Thus, by water being jetted rearward from the two second outlets 30, forces (thrusts generated by the pair of second propulsion mechanisms 5) in the forward direction are applied to the hull 2 and the vessel 1 is driven straight forward without turning to the right or left.

Figure 12:
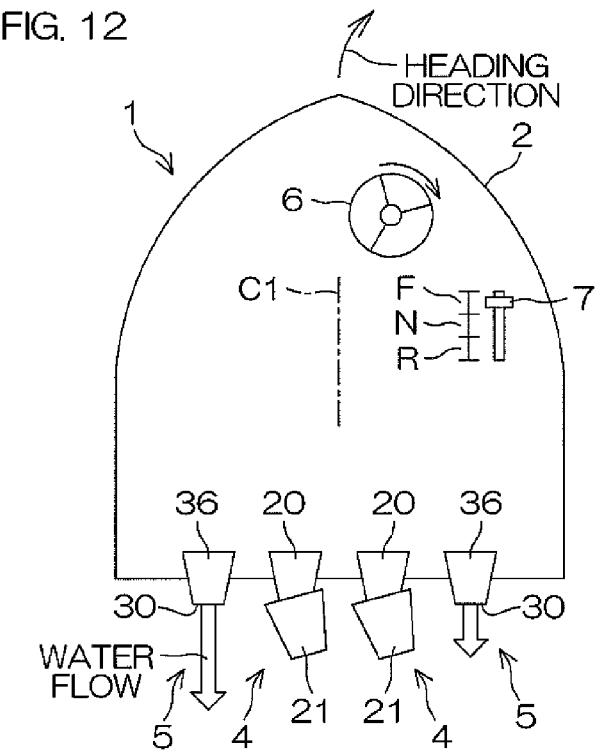
FIG. 12 is a schematic plan view for explaining the thrust directions when the pair of second propulsion mechanisms make the vessel turn while driving it forward.

FIG. 12 is a schematic plan view for explaining the thrust directions when the pair of second propulsion mechanisms 5 make the vessel 1 turn while driving it forward.

When the vessel operator makes the vessel 1 turn while it is being driven forward, the steering handle 6 is steered and the lever 7 is positioned in the F region. In the state in which the steering handle 6 is steered and the lever 7 is positioned in the F region, a command from the main ECU 48 is input into the two motor ECUs 50, and the two motor ECUs 50 respectively control the two electric motors 27 such that the magnitudes of the outputs of the two electric motors 27 differ. The two second impellers 33 are thereby driven to rotate in the forward rotation direction and water is jetted from the two second outlets 30 in directions aligned with the front/rear direction in a plan view. The magnitude of the thrust from one second propulsion mechanism 5 and the magnitude of the thrust from the other second propulsion mechanism 5 differ because the magnitudes of the outputs of the two electric motors 27 differ. Further, the pair of second propulsion mechanisms 5 are disposed right/left symmetrically. Thus, by water being jetted rearward from the two second outlets 30, forces (thrusts generated by the pair of second propulsion mechanisms 5) in forward drive directions that make the hull 2 turn are applied to the hull 2 and the vessel 1 is driven forward while turning at an angle that is in accordance with the position of the steering handle 6. That is, the main ECU 48 makes the vessel 1 turn by controlling the two motor ECUs such that a difference arises in the thrusts generated by the pair of second propulsion mechanisms 5.

FIG. 13 is a schematic plan view for explaining the thrust directions when the pair of second propulsion mechanisms 5 drive the vessel 1 in reverse.

When the vessel operator makes the vessel 1 be driven straight in reverse, the steering handle 6 is positioned at the straight driving position and the lever 7 is positioned in the R region. In the state in which the steering handle 6 is positioned at the straight driving position and the lever 7 is positioned in the R region, a command from the main ECU 48 is input into the two motor ECUs 50, and the two motor ECUs 50 respectively control the two electric motors 27 such that the magnitudes of the outputs of the two electric motors 27 are matched. The two second impellers 33 are thereby driven to rotate in the reverse rotation direction and water is jetted from the two second inlets 29 in directions aligned with the front/rear direction in a plan view. The magnitudes of the thrusts generated by the respective second propulsion mechanisms 5 are matched because the magnitudes of the outputs of the two electric motors 27 are matched. Further, the pair of second propulsion mechanisms 5 are disposed right/left symmetrically. Thus, by water being jetted forward from the two second inlets 29, forces (thrusts generated by the pair of second propulsion mechanisms 5) in the rearward direction are applied to the hull 2 and the vessel 1 is driven straight in reverse without turning to the right or left.

FIG. 14 is a schematic plan view for explaining the thrust directions when the pair of second propulsion mechanisms 5 make the vessel 1 turn while driving it in reverse.

When the vessel operator makes the vessel 1 turn while it is being driven in reverse, the steering handle 6 is steered and the lever 7 is positioned in the R region. In the state in which the steering handle 6 is steered and the lever 7 is positioned in the R region, a command from the main ECU 48 is input into the two motor ECUs 50, and the two motor ECUs 50 respectively control the two electric motors 27 such that the magnitudes of the outputs of the two electric motors 27 differ. The two second impellers 33 are thereby driven to rotate in the reverse rotation direction and water is jetted from the two second inlets 26 in directions that are aligned with the front/rear direction in a plan view. The magnitude of the thrust from one second propulsion mechanism 5 and the magnitude of the thrust from the other second propulsion mechanism 5 differ because the magnitudes of the outputs of the two electric motors 27 differ. Further, the pair of second propulsion mechanisms 5 are disposed right/left symmetrically. Thus, by water being jetted forward from the two second inlets 29, forces (thrusts generated by the pair of second propulsion mechanisms 5) in reverse drive directions that make the hull 2 turn are applied to the hull 2 and the vessel 1 is driven in reverse while turning at an angle that is in accordance with the position of the steering handle 6.

Next, the thrust directions when the pair of first propulsion mechanisms 4 and the pair of second propulsion mechanisms 5 propel the vessel 1 shall be described. Propulsion of the vessel 1 by the pair of first propulsion mechanisms 4 and the pair of second propulsion mechanisms 5 may be performed when the vessel 1 is running in any speed region.

Figure 15:
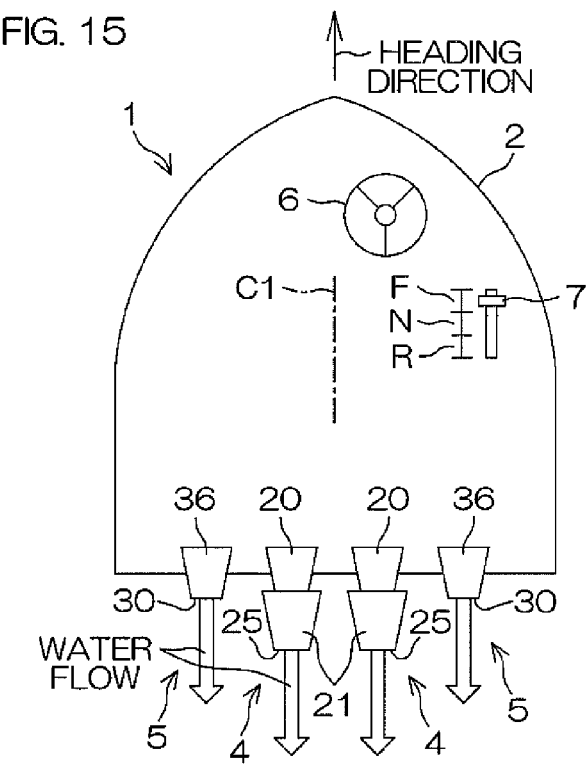
FIG. 15 is a schematic plan view for explaining the thrust directions when the pair of first propulsion mechanisms and the pair of second propulsion mechanisms drive the vessel forward.

FIG. 15 is a schematic plan view for explaining the thrust directions when the pair of first propulsion mechanisms 4 and the pair of second propulsion mechanisms 5 drive the vessel 1 forward.

When the vessel operator makes the vessel 1 be driven straight forward, the steering handle 6 is positioned at the straight driving position and the lever 7 is positioned in the F region. The two first deflectors 21 are thus positioned such that the jetting directions of water from the forward drive outlets 25 are aligned with the front/rear direction in a plan view and the two first buckets 12 are positioned at the forward drive positions. Further, the two engine ECUs 49 respectively control the two engines 10 such that the magnitudes of the outputs of the two engines 10 are matched. Meanwhile, the two motor ECUs 50 respectively control the two electric motors 27 such that the magnitudes of the outputs of the two electric motors 27 are matched. The second impellers 33 are thereby driven to rotate in the forward rotation direction. Water is thus jetted rearward from the respective outlets 25 and 30 and forces (thrusts generated by the pair of first propulsion mechanisms 4 and the pair of second propulsion mechanisms 5) in the forward direction are applied to the hull 2. Thus, the vessel 1 is driven straight forward without turning to the right or left.

Figure 16:
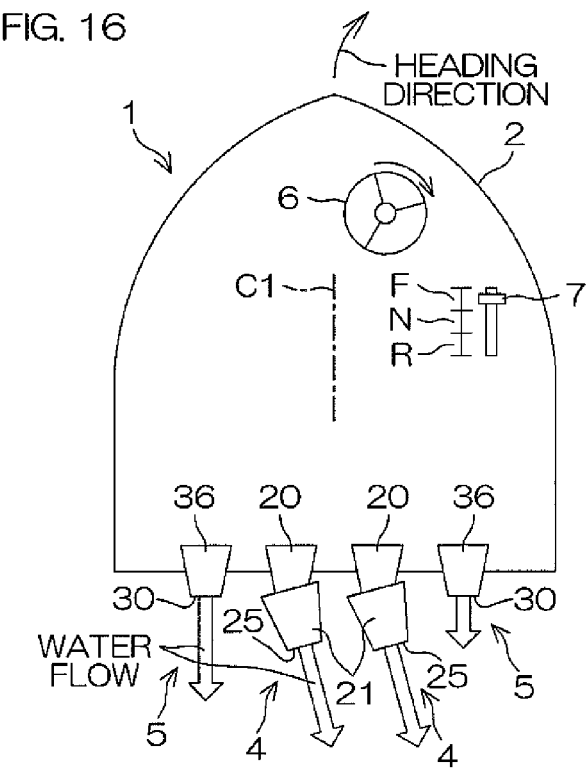
FIG. 16 is a schematic plan view for explaining the thrust directions when the pair of first propulsion mechanisms and the pair of second propulsion mechanisms make the vessel turn while driving it forward.

FIG. 16 is a schematic plan view for explaining the thrust directions when the pair of first propulsion mechanisms 4 and the pair of second propulsion mechanisms 5 make the vessel 1 turn while driving it forward.

When the vessel operator makes the vessel 1 turn while it is being driven forward, the steering handle 6 is steered and the lever 7 is positioned in the F region. The two first deflectors 21 are thus positioned such that the jetting directions of water from the forward drive outlets 25 are inclined to the right or left with respect to the front/rear direction in a plan view and the two first buckets 12 are positioned at the forward drive positions. Further, the two engine ECUs 49 respectively control the two engines 10 such that the magnitudes of the outputs of the two engines 10 are matched. Meanwhile, the two motor ECUs 50 respectively control the two electric motors 27 such that the magnitudes of the outputs of the two electric motors 27 differ. The second impellers 33 are thereby driven to rotate in the forward rotation direction. Water is thus jetted rearward from the respective outlets 25 and 30 and forces (thrusts generated by the pair of first propulsion mechanisms 4 and the pair of second propulsion mechanisms 5) in forward drive directions that make the hull 2 turn are applied to the hull 2. The vessel 1 is thus driven forward while turning at an angle that is in accordance with the position of the steering handle 6.

Figure 17:
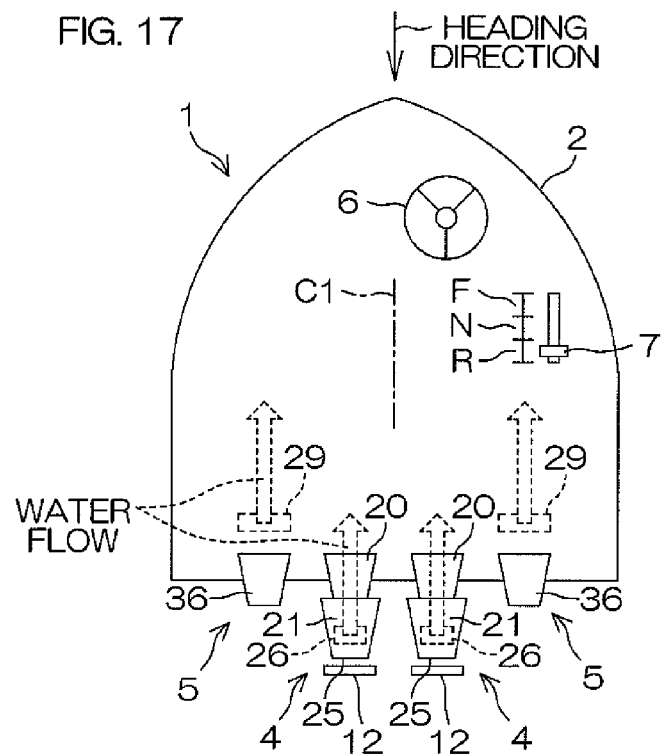
FIG. 17 is a schematic plan view for explaining the thrust directions when the pair of first propulsion mechanisms and the pair of second propulsion mechanisms drive the vessel in reverse.

FIG. 17 is a schematic plan view for explaining the thrust directions when the pair of first propulsion mechanisms 4 and the pair of second propulsion mechanisms 5 drive the vessel 1 in reverse.

When the vessel operator makes the vessel 1 be driven straight in reverse, the steering handle 6 is positioned at the straight driving position and the lever 7 is positioned in the R region. The two first deflectors 21 are thus positioned such that the jetting directions of water from the reverse drive outlets 26 are aligned with the front/rear direction in a plan view and the two first buckets 12 are positioned at the reverse drive positions. Further, the two engine ECUs 49 respectively control the two engines 10 such that the magnitudes of the outputs of the two engines 10 are matched. Meanwhile, the two motor ECUs 50 respectively control the two electric motors 27 such that the magnitudes of the outputs of the two electric motors 27 are matched. The second impellers 33 are thereby driven to rotate in the reverse rotation direction. Water is thus jetted forward from the respective reverse drive outlets 26 and the respective inlets 29 and forces (thrusts generated by the pair of first propulsion mechanisms 4 and the pair of second propulsion mechanisms 5) in the rearward direction are applied to the hull 2. The vessel 1 is thus driven straight in reverse without turning to the right or left.

Figure 18:
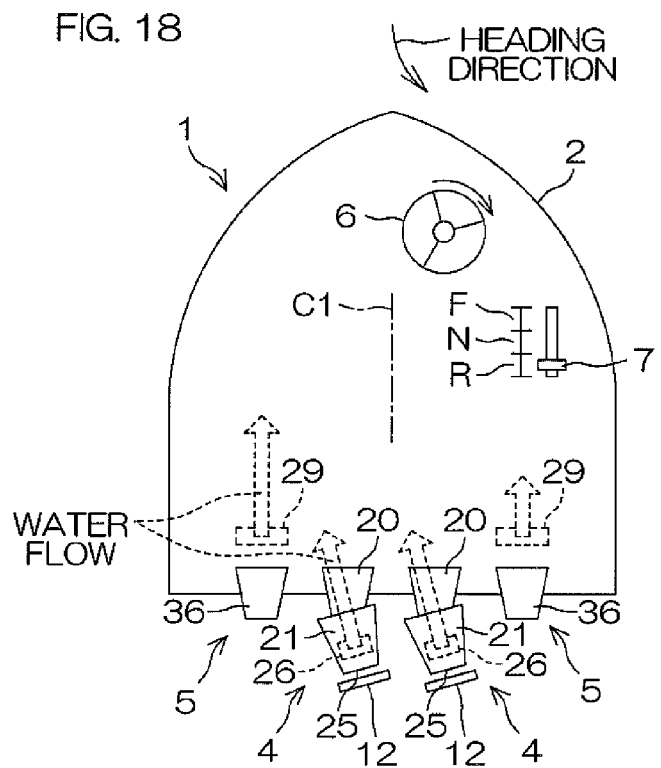
FIG. 18 is a schematic plan view for explaining the thrust directions when the pair of first propulsion mechanisms and the pair of second propulsion mechanisms make the vessel turn while driving it in reverse.

FIG. 18 is a schematic plan view for explaining the thrust directions when the pair of first propulsion mechanisms 4 and the pair of second propulsion mechanisms 5 make the vessel 1 turn while driving it in reverse.

When the vessel operator makes the vessel 1 turn while it is being driven in reverse, the steering handle 6 is steered and the lever 7 is positioned in the R region. The two first deflectors 21 are thus positioned such that the jetting directions of water from the reverse drive outlets 26 are inclined to the right or left with respect to the front/rear direction in a plan view and the two first buckets 12 are positioned at the reverse drive positions. Further, the two engine ECUs 49 respectively control the two engines 10 such that the magnitudes of the outputs of the two engines 10 are matched. Meanwhile, the two motor ECUs 50 respectively control the two electric motors 27 such that the magnitudes of the outputs of the two electric motors 27 differ. The second impellers 33 are thereby driven to rotate in the reverse rotation direction. Water is thus jetted forward from the respective reverse drive outlets 26 and the respective inlets 29 and forces (thrusts generated by the pair of first propulsion mechanisms 4 and the pair of second propulsion mechanisms 5) in reverse drive direction that make the hull 2 turn are applied to the hull 2. The vessel 1 is thus driven in reverse while turning at an angle that is in accordance with the position of the steering handle 6.

Figure 19:
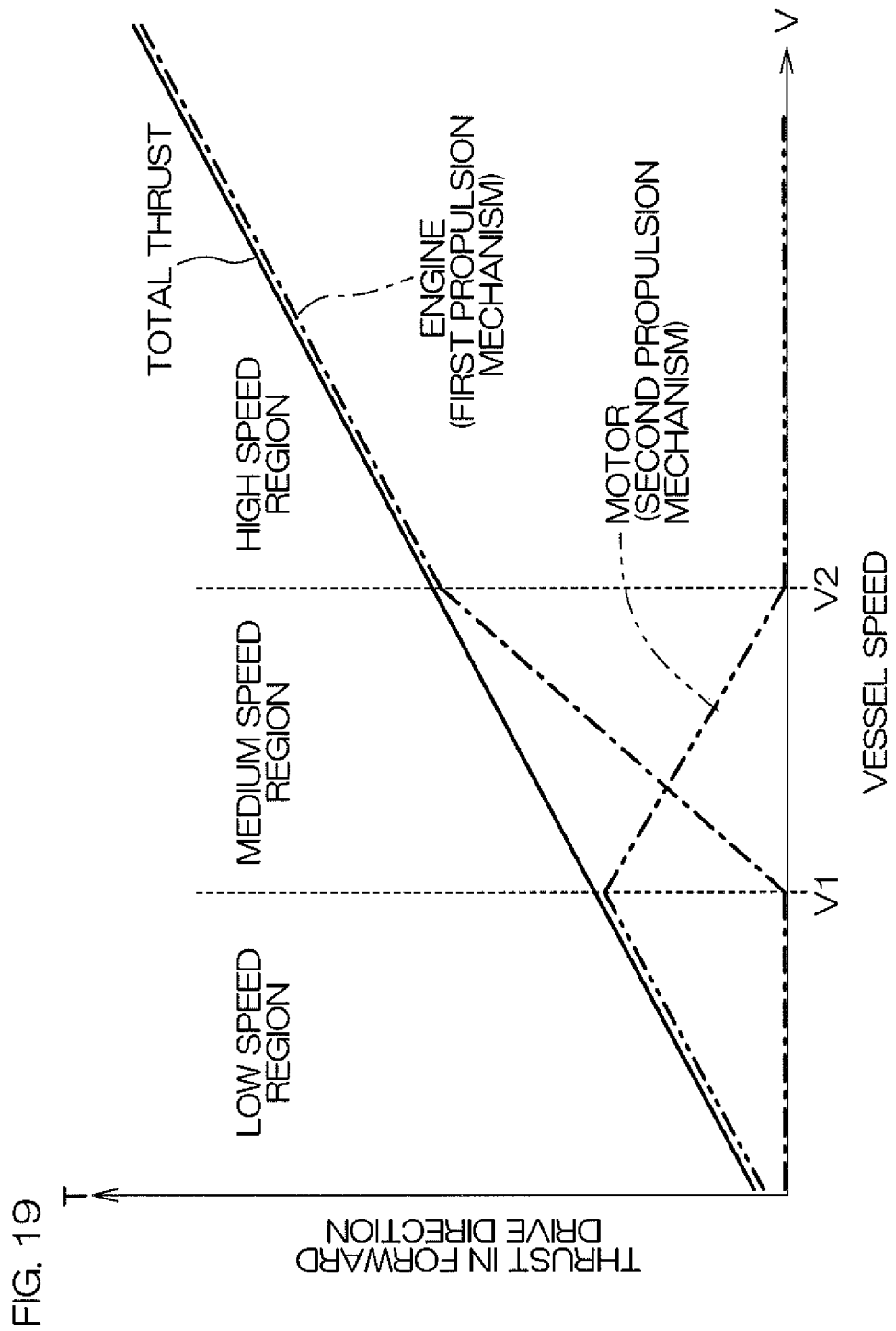
FIG. 19 is a graph of an example of a relationship of thrusts in the forward drive direction and the speed of the vessel.

FIG. 19 is a graph of an example of a relationship of thrusts in the forward drive direction and the speed of the vessel 1.

The main ECU 48 switches operations of the first propulsion mechanisms 4 and the second propulsion mechanisms 5 in accordance with the speed V of the vessel 1. Specifically, as shown in FIG. 19, in a low speed region in which the speed V of the vessel 1 is less than a predetermined first speed V1 (for example, 5 miles per hour), the main ECU 48, for example, makes the vessel 1 be propelled by just the pair of second propulsion mechanisms 5. When the vessel 1 is to be accelerated in the low speed region, the main ECU 48 makes the thrusts from the pair of second propulsion mechanisms 5 increase (see alternate long and two short dashed lines in FIG. 19). In the low speed region, the pair of first propulsion mechanisms 4 are not used and the magnitude of the thrusts of the pair of second propulsion mechanisms 5 corresponds to the magnitude of the thrust of the vessel 1 as a whole (see the alternate long and two short dashed lines and solid line in FIG. 19).

Also, in a medium speed region in which the speed V of the vessel 1 is not less than the first speed V1 but less than a second speed V2 that is greater than the first speed V1, the main ECU 48, for example, makes the vessel 1 be propelled by the pair of first propulsion mechanisms 4 and the pair of second propulsion mechanisms 5. When the vessel 1 is to be accelerated in the medium speed region, the main ECU 48 makes the thrusts of the pair of first propulsion mechanisms 4 increase and the thrusts of the pair of second propulsion mechanisms 5 decrease (see alternate long and short dashed lines and the alternate long and two short dashed lines in FIG. 19). That is, the thrusts of the first propulsion mechanisms 4 and the second propulsion mechanisms 5 are controlled such that the thrust of the vessel 1 as a whole does not increase suddenly. In the medium speed region, a sum of the thrusts of the pair of first propulsion mechanisms 4 and the thrusts of the pair of second propulsion mechanisms 5 corresponds to being the magnitude of the thrust of the vessel 1 as a whole.

Also, in a high speed region in which the speed V of the vessel 1 is not less than the second speed V2, the main ECU 48, for example, makes the vessel 1 be propelled by just the pair of first propulsion mechanisms 4. When the vessel 1 is to be accelerated in the high speed region, the main ECU 48 makes the thrust from the pair of first propulsion mechanisms 4 increase. In the high speed region, the pair of second propulsion mechanisms 5 are not used and the magnitude of the thrust of the pair of first propulsion mechanisms 4 corresponds to being the magnitude of the thrust of the vessel 1 as a whole.

Figure 20:
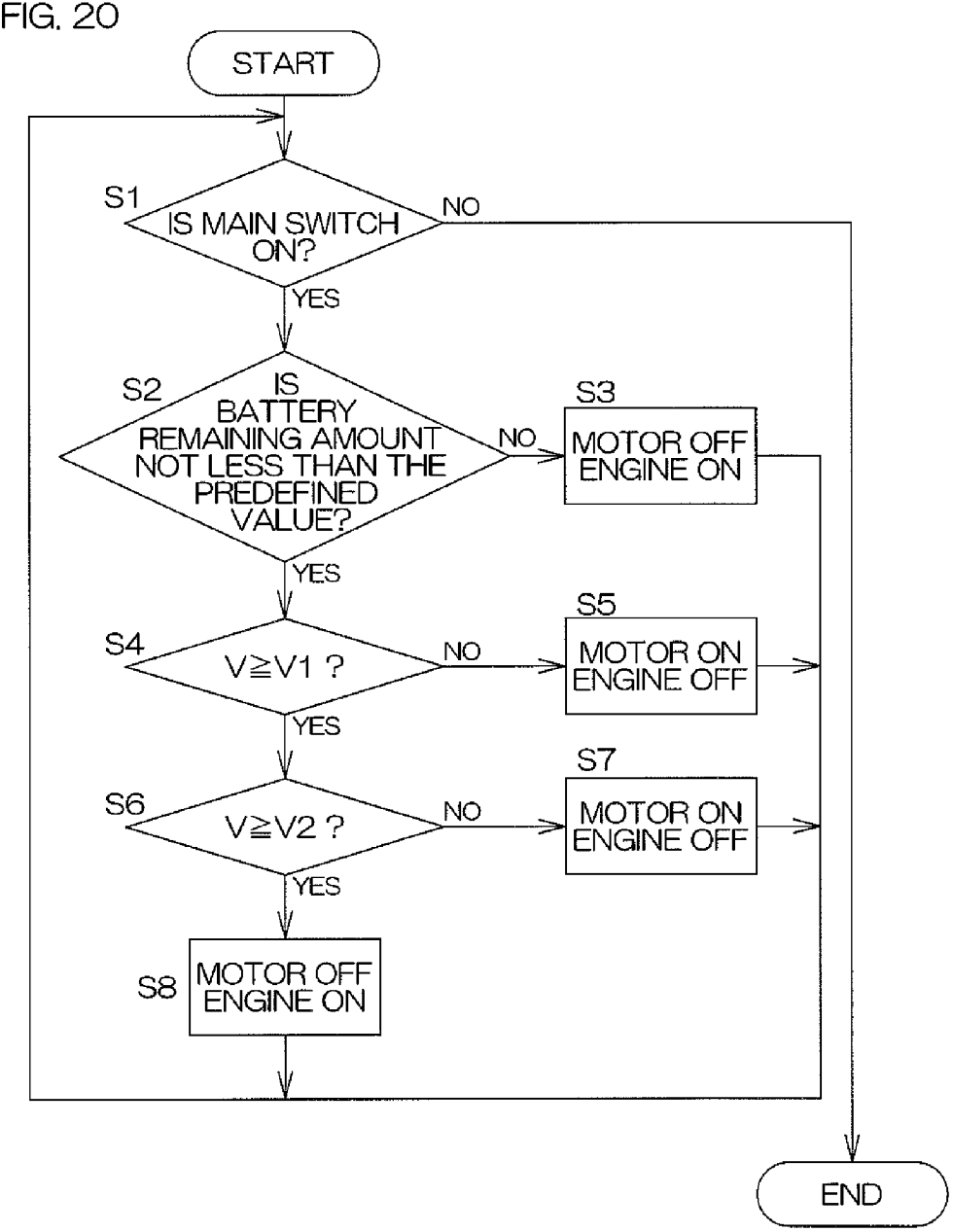
FIG. 20 is a flowchart for explaining control of the vessel according to the first preferred embodiment of the present invention.

FIG. 20 is a flowchart for explaining control of the vessel 1 according to the first preferred embodiment of the present invention. In the following description, control of the vessel 1 in a case where the lever 7 is positioned in the F region shall be described.

The main ECU 48, for example, switches between the first propulsion mechanisms 4 and the second propulsion mechanisms 5 in accordance with a remaining amount of electric power of the battery 52. Specifically, the main ECU 48 judges whether or not the main switch 54 is on (S1). If the main switch 54 is off (NO at S1), the vessel 1 is not propelled even if the lever 7 is positioned in the F region. On the other hand, if the main switch 54 is on (YES at S1), the main ECU 48 judges, based on a detection value of the remaining amount detector 53, whether or not the remaining amount of electric power of the battery 52 is not less than a predefined value (S2).

If the remaining amount of electric power of the battery 52 is less than the predefined value (NO at S2), the main ECU 48 controls the engines 10 such that the engine ECUs 49 cause the vessel 1 to be propelled by the pair of first propulsion mechanisms 4 (S3). As described above, by making the pair of first propulsion mechanisms 4 propel the vessel 1 without using the pair of second propulsion mechanisms 5, the electric motors 27 are driven to rotate by water flows and generate electricity. The battery 52 is thereby charged. That is, when the remaining amount of electric power of the battery 52 is less than the predefined value, the main ECU 48 makes the vessel 1 be propelled by just the pair of first propulsion mechanisms 4 and charges the battery 52. Then, while making the pair of first propulsion mechanisms 4 propel the vessel 1, the main ECU 48 judges again whether or not the main switch 54 is on (returns to S1).

On the other hand, if the remaining amount of electric power of the battery 52 is not less than the predefined value (YES at S2), the main ECU 48 judges, based on a detection value of the speed detector 51, whether or not the speed V of the vessel 1 is less than the first speed V1 (S4). That is, the main ECU 48 judges whether or not the speed V of the vessel 1 is in the low speed region.

If the remaining amount of electric power of the battery 52 is not less than the predefined value and the speed V of the vessel 1 is less than the first speed V1 (NO at S4), the main ECU 48 controls the electric motors 27 such that the motor ECUs 50 cause the vessel 1 to be propelled by the pair of second propulsion mechanisms 5 (S5). Thereafter, while making the pair of second propulsion mechanisms 5 propel the vessel 1, the main ECU 48 judges again whether or not the main switch 54 is on (returns to S1).

On the other hand, if the speed V of the vessel 1 is not less than the first speed V1 (YES at S4), the main ECU 48 judges whether or not the speed V of the vessel 1 is less than the second speed V2 (S6). That is, the main ECU 48 judges whether or not the speed V of the vessel 1 is in the medium speed region.

If the speed V of the vessel 1 is not less than the first speed V1 and less than the second speed V2 (NO at S6), the main ECU 48 controls the engines 10 by the engine ECUs 49 such that the vessel 1 is propelled by the pair of first propulsion mechanisms 4. Further, the main ECU 48 controls the electric motors 27 by the motor ECUs 50 such that the vessel 1 is propelled by the pair of second propulsion mechanisms 5. That is, the main ECU 48 makes the vessel 1 be propelled by the pair of first propulsion mechanisms 4 and the pair of second propulsion mechanisms 5 (S7). Then, while making the pair of first propulsion mechanisms 4 and the pair of second propulsion mechanisms 5 propel the vessel 1, the main ECU 48 judges again whether or not the main switch 54 is on (returns to S1).

On the other hand, if the speed V of the vessel 1 is not less than the second speed V2 (YES at S6), that is, if the speed V of the vessel 1 is in the high speed region, the main ECU 48 controls the engines 10 by the engine ECUs 49 such that the vessel 1 is propelled by the pair of first propulsion mechanisms 4 (S8). Then, while making the pair of first propulsion mechanisms 4 propel the vessel 1, the main ECU 48 judges again whether or not the main switch 54 is on (returns to S1).

As described above, when the remaining amount of electric power of the battery 52 is less than the predefined value, the main ECU 48 makes the pair of first propulsion mechanisms 4 propel the vessel 1 regardless of the speed V of the vessel 1. The battery 52 is thereby charged. When the remaining amount of electric power of the battery 52 becomes not less than predefined value, the main ECU 48 drives the first propulsion mechanisms 4 and the second propulsion mechanisms 5 in accordance with the speed V1 of the vessel 1.

As described above, with the first preferred embodiment, the first propulsion mechanisms 4 generate thrusts by the engines 10 and the second propulsion mechanisms 5 generate thrusts by the electric motors 27. The vessel 1 is thereby propelled. The directions of thrusts generated by the pair of first propulsion mechanisms 4 and the directions of thrusts generated by the pair of second propulsion mechanisms 5 are matched. The marine vessel 1 can thus be propelled in the same direction by either of the first propulsion mechanisms 4 and the second propulsion mechanisms 5. Further, the first propulsion mechanisms 4 and the second propulsion mechanisms 5 are mutually independent. Thus, by adding the second propulsion mechanisms 5 to a conventional vessel that includes engines, the vessel 1 can be propelled by the two types of drive source of the engines 10 and the electric motors 27 without making a significant change in an existing structure related to the engines.

Also in the first preferred embodiment, the main ECU 48 preferably controls the pair of second propulsion mechanisms 5 to make thrusts of different magnitudes be generated from each of the pair of second propulsion mechanisms 5. The pair of second propulsion mechanisms 5 are disposed at respective sides of the central portion 9 of the hull 2 in regard to the width direction of the hull 2. Thus, by the main ECU 48 making thrusts of different magnitudes be generated from each of the pair of second propulsion mechanisms 5, forces (thrusts generated by the pair of second propulsion mechanisms 5) that turn the hull 2 are applied to the hull 2 and the vessel 1 turns. Thus, a member arranged to convert the thrust direction to the right and left, such as the first deflector 21, does not have to be provided in each of the second propulsion mechanisms 5. Complicating of the structure of the vessel 1 can thus be prevented.

Also in the first preferred embodiment, the electric motors 27 are preferably arranged to be capable of forward rotation and reverse rotation. By forward rotations of the electric motors 27, water is jetted from the second outlets 30 of the second jet pumps 28, and by reverse rotations of the electric motors 27, water is sucked in from the second outlets 30 of the second jet pumps 28. Thus, between forward rotations of the electric motors 27 and reverse rotations of the electric motors 27, thrusts of mutually opposite directions are generated. The directions of thrusts generated by the second propulsion mechanisms 5 are thus switched in accordance with the rotation directions of the electric motor 27. Thus, a member arranged to convert the thrust direction to the front and rear, such as the first bucket 12, does not have to be provided in each of the second propulsion mechanisms 5. Complicating the structure of the vessel 1 can thus be prevented.

Also, with the first preferred embodiment, when the vessel 1 is running in the medium speed region, the main ECU 48 makes the thrusts of the pair of first propulsion mechanisms 4 increase in accordance with increase in speed of the vessel 1 and makes the thrusts of the pair of second propulsion mechanisms 5 decrease with increase in speed of the vessel 1. Sudden increase in the thrust of the vessel 1 as a whole in accordance with an increase in speed of vessel 1 is thereby prevented. The vessel 1 can thus be accelerated smoothly in the medium speed region.

Also, with the first preferred embodiment, the hull 2 includes the bottom portion 44 having a V-shaped configuration from a rearward view and the first propulsion mechanisms 4 and the second propulsion mechanisms 5 are disposed at the bottom portion 44. The distance D2 in the width direction of the hull 2 from the hull center C1 to each second propulsion mechanism 5 is longer than the distance D1 in the width direction of the hull 2 from the hull center C1 to each first propulsion mechanism 4. That is, the second inlet 29 of each second propulsion mechanism 5 is positioned above the first inlet 13 of each first propulsion mechanism 4 and thus the water pressure applied to each second inlet 29 is less than the water pressure applied to each first inlet 13. In a state in which the vessel 1 is propelled by just the pair of first propulsion mechanisms 4, water enters into the second inlets 29 due to water pressure and a resistance is applied to the vessel 1. Especially, in the high speed region, the vessel 1 is propelled by just the pair of first propulsion mechanisms 4 and thus a large resistance due to entry of water into the second inlets 29 is applied to the vessel 1 in the high speed region. Thus, by reducing the water pressure applied to each second inlet 29, the resistance applied to the vessel 1 in the high speed region can be reduced.

Also, in the first preferred embodiment, when the vessel 1 is propelled by just the pair of first propulsion mechanisms 4, the electric motors 27 are driven to rotate by the water flows flowing into the second propulsion mechanisms 5 (second flow passages 31) and the electric motors 27 generate electricity. The electric power generated by the electric motors 27 is supplied to the battery 52 connected to the electric motors 27. Thus, even when the remaining amount of electric power of the battery 52 is less than the predefined value, the battery 52 can be charged to not less than the predefined value by making the vessel 1 be propelled by just the first propulsion mechanisms 4.

Other Preferred Embodiments

Although the first preferred embodiment has been described above, the present invention is not restricted to the details of the first preferred embodiment and various changes are possible within the scope of the claims.

For example, with the first preferred embodiment, the case where the directions of jetting of water from the forward drive outlets 25 and the reverse drive outlets 26 preferably are aligned in the front/rear direction in a plan view when the steering handle 6 is at the straight driving position was described. However, as long as the direction of the force applied to the hull 2 is in the forward direction or the rearward direction when the steering handle 6 is at the straight drive position, the directions of jetting of water from the forward drive outlets 25 and the reverse drive outlets 26 may be inclined with respect to the front/rear direction in a plan view when the steering handle 6 is at the straight driving position.

For example, water may be jetted from the forward drive outlets 25 and the reverse drive outlets 26 in directions away from the hull center C1 when the steering handle 6 is at the straight driving position. That is, water may be jetted in a V-shaped manner in a plan view from two outlets (the two forward drive outlets 25 or the two reverse drive outlets 26). Further, the jetting directions of water from the forward drive outlets 25 and the reverse drive outlets 26 may be inclined with respect to a horizontal plane. In a case where water is jetted in a V-shaped manner in a plan view from two outlets, it suffices that a direction of a resultant force (thrust) generated by the pair of first propulsion mechanisms 4 is matched with the directions of the thrusts generated by the pair of second propulsion mechanisms 5 when the steering handle 6 is at the straight driving position.

Likewise, with the first preferred embodiment, a case where the directions of jetting of water from the second outlets 30 are preferably aligned in the front/rear direction in a plan view when the steering handle 6 is at the straight driving position was described. However, as long as the direction of the force applied to the hull 2 is in the forward direction or the rearward direction when the steering handle 6 is at the straight drive position, the directions of jetting of water from the second outlets 30 may be inclined with respect to the front/rear direction in a plan view when the steering handle 6 is at the straight driving position. Further, the jetting directions of water from the second outlets 30 may be inclined with respect to the horizontal plane. In a case where water is jetted in a V-shaped manner in a plan view from the two second outlets 30, it suffices that the directions of the thrusts generated by the pair of first propulsion mechanisms 4 are matched with a direction of a resultant force (thrust) generated by the pair of second propulsion mechanisms 5 when the steering handle 6 is at the straight driving position.

That is, it suffices that in the case where water is jetted obliquely from the respective outlets 25, 26, and 30 when the steering handle 6 is at the straight driving position, the direction of the resultant force generated by the pair of first propulsion mechanisms 4 and the direction of the resultant force generated by the pair of second propulsion mechanisms 5 are matched when the steering handle 6 is at the straight driving position. That is, "matching of the directions of the thrusts generated by the pair of first propulsion mechanisms 4 and the directions of the thrusts generated by the pair of second propulsion mechanisms 5" includes the matching of the direction of the resultant force generated by the pair of first propulsion mechanisms 4 and the direction of the resultant force generated by the pair of second propulsion mechanisms 5.

Also, with the first preferred embodiment, the case was described where the vessel 1 is turned by the directions of the water jetted from the first outlets 14 being converted by the first deflectors 21. However, the vessel 1 may be turned without using the first deflectors 21. That is, the main ECU 48 may make the vessel 1 turn by making the magnitude of the thrust from one first propulsion mechanism 4 and the magnitude of the thrust from the other first propulsion mechanism 4 differ. In this case, the first deflector 21 does not have to be provided.

Also, with the first preferred embodiment, the case was described where, when the vessel 1 is to be turned by the pair of first propulsion mechanisms 4 and the pair of second propulsion mechanisms 5, forces that turn the hull 2 are applied to the hull 2 from both the first propulsion mechanisms 4 and the second propulsion mechanisms 5. However, the main ECU 48 may instead make a force that turns the hull 2 be applied to the hull 2 from the pair of first propulsion mechanisms 4 and make a force that propels the hull 2 in the forward direction or rearward direction be applied to the hull 2 from the pair of second propulsion mechanisms 5. Likewise, the main ECU 48 may make a force that turns the hull 2 be applied to the hull 2 from the pair of second propulsion mechanisms 5 and make a force that propels the hull 2 in the forward direction or rearward direction be applied to the hull 2 from the pair of first propulsion mechanisms 4.

Also, with the first preferred embodiment, the case was described where propulsion of the vessel 1 by the pair of first propulsion mechanisms 4 and the pair of second propulsion mechanisms 5 is performed preferably in the medium speed range in which the speed V of the vessel 1 is not less than the first speed V1 and less than the second speed V2. However, propulsion of the vessel 1 by the pair of first propulsion mechanisms 4 and propulsion of the vessel 1 by the pair of second propulsion mechanisms 5 may be performed without performing propulsion of the vessel 1 by the pair of first propulsion mechanisms 4 and the pair of second propulsion mechanisms 5.

Specifically, the first speed V1 and the second speed V2 may be the same speed. That is, propulsion of the vessel 1 by the pair of second propulsion mechanisms 5 may be performed in a low speed region in which the speed V of the vessel 1 is less than the first speed V1. Further, propulsion of the vessel 1 by the pair of first propulsion mechanisms 4 may be performed in the high speed region in which the speed V of the vessel 1 is not less than the first speed V1. With reference to FIG. 20, in a case where the speed V of the vessel 1 is not less than the first speed V1 (YES at S4), the main ECU 48 may control the engines 10 by the engine ECUs 49 such that the vessel 1 is propelled by the pair of first propulsion mechanisms 4 (S8).

Also, with the first preferred embodiment, the case was described where two of each of the first propulsion mechanisms 4 and two of each of the second propulsion mechanisms 5 are preferably provided and the pair of second propulsion mechanisms 5 are disposed at respective sides of the pair of the first propulsion mechanisms 4 in regard to the width direction of the hull 2. However, the number of first propulsion mechanisms 4 is not restricted to two and may be one or may be not less than three. The same applies to the second propulsion mechanism 5. Further, the positioning of the first propulsion mechanism 4 and the second propulsion mechanism 5 may be set appropriately in accordance with the numbers of the respective mechanisms.

Figure 21:
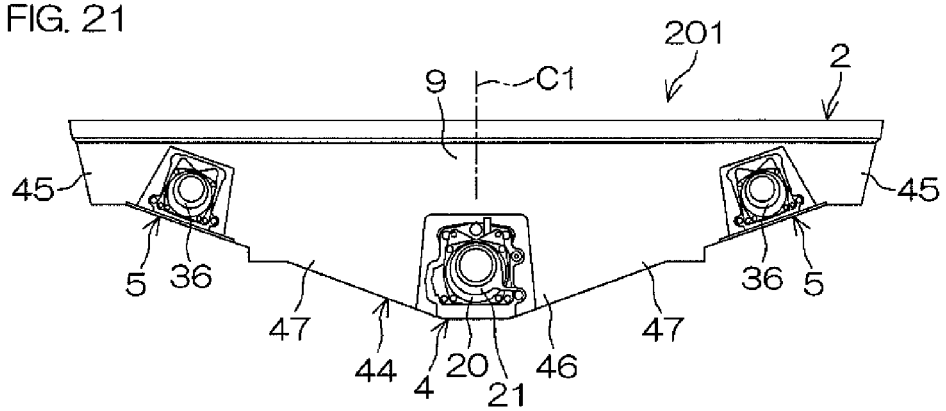
FIG. 21 is a rear view for explaining the arrangement of the vessel according to a second preferred embodiment of the present invention.

Specifically, for example, as in a vessel 201 shown in FIG. 21, a first propulsion mechanism 4 may be disposed at the central portion 9 of the hull 2 and a pair of second propulsion mechanisms 5 may be disposed at respective sides of the central portion 9 of the hull 2. In this case, the pair of second propulsion mechanisms 5 are preferably disposed right/left symmetrically.

Figure 22:
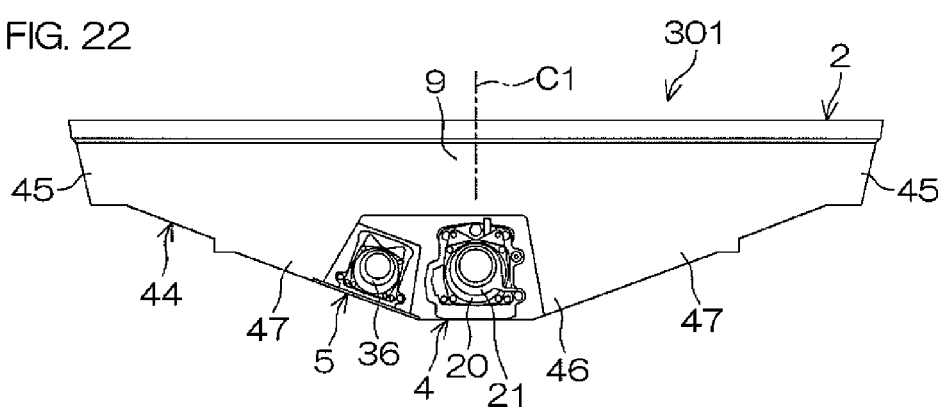
FIG. 22 is a rear view for explaining the arrangement of the vessel according to a third preferred embodiment of the present invention.

Also, for example, a first propulsion mechanism 4 and a second propulsion mechanism 5 may be disposed at the central portion 9 of the hull 2 and the second propulsion mechanism 5 may be adjacent to the first propulsion mechanism 4 as in a vessel 301 shown in FIG. 22. Likewise, for example, the first propulsion mechanism 4 and the second propulsion mechanism 5 may be disposed at the central portion 9 of the hull 2 and the second propulsion mechanism 5 may be adjacent to the first propulsion mechanism 4 as in a vessel 401 shown in FIG. 23.

Figure 23:
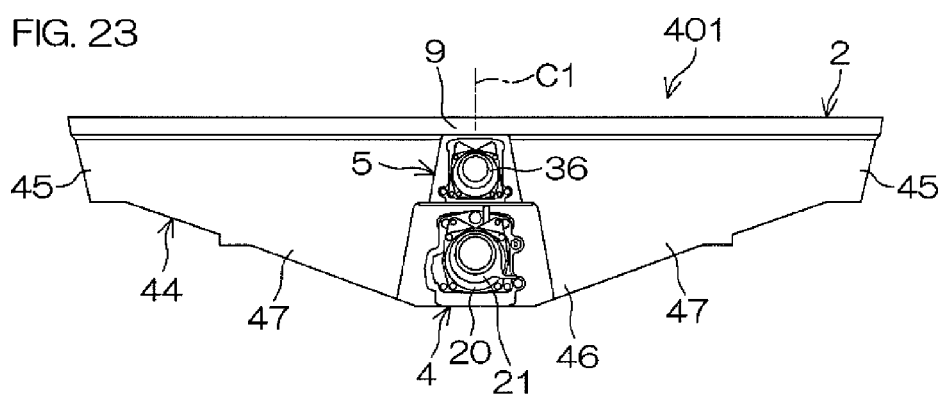
FIG. 23 is a rear view for explaining the arrangement of the vessel according to a fourth preferred embodiment of the present invention.

In a case where the second propulsion mechanism 5 is adjacent to the first propulsion mechanism 4, the second propulsion mechanism 5 may be disposed at a side of the first propulsion mechanism 4 as shown in FIG. 22 or may be disposed above the first propulsion mechanism 4 as shown in FIG. 23. Also, although not illustrated, the second propulsion mechanism 5 may be disposed below the first propulsion mechanism 4.

Figure 24:
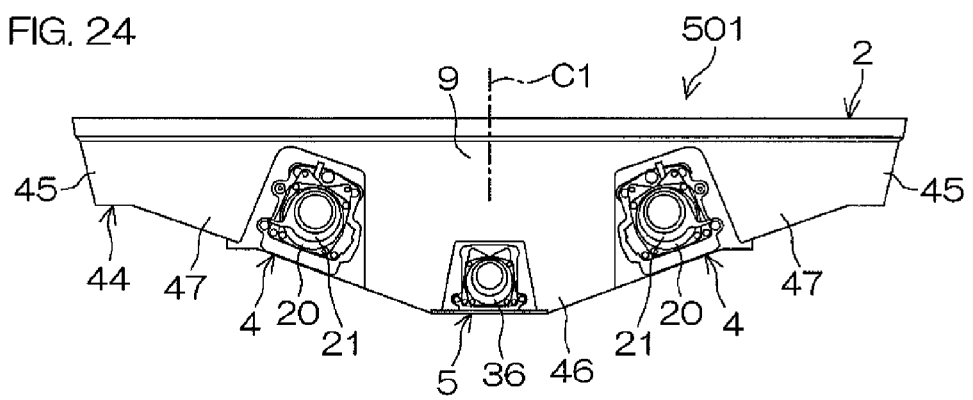
FIG. 24 is a rear view for explaining the arrangement of the vessel according to a fifth preferred embodiment of the present invention.

Also, for example, as in a vessel 501 shown in FIG. 24, a second propulsion mechanism 5 may be disposed at the central portion 9 of the hull 2 and a pair of first propulsion mechanisms 4 may be disposed at respective sides of the central portion 9 of the hull 2. In this case, the pair of first propulsion mechanisms 4 are preferably disposed right/left symmetrically.

Also, in a case where the number of the second propulsion mechanisms 5 included in the vessel 301, 401, or 501 is one as shown in each of FIG. 22 to FIG. 24, the vessel 301, 401, or 501 cannot be made to turn by differing the thrusts generated by the pair of second propulsion mechanisms 5 as described above. Thus, in the case where the number of the second propulsion mechanisms 5 included in the vessel 301, 401, or 501 is one, the first deflector 21 may be mounted to the second nozzle 36 and the direction of jetting of water may be changed to the right and left by the first deflector 21. The vessel 301, 401, or 501 can thereby be made to turn even when the vessel 301, 401, or 501 is propelled just by the second propulsion mechanism 5.

Figure 25:
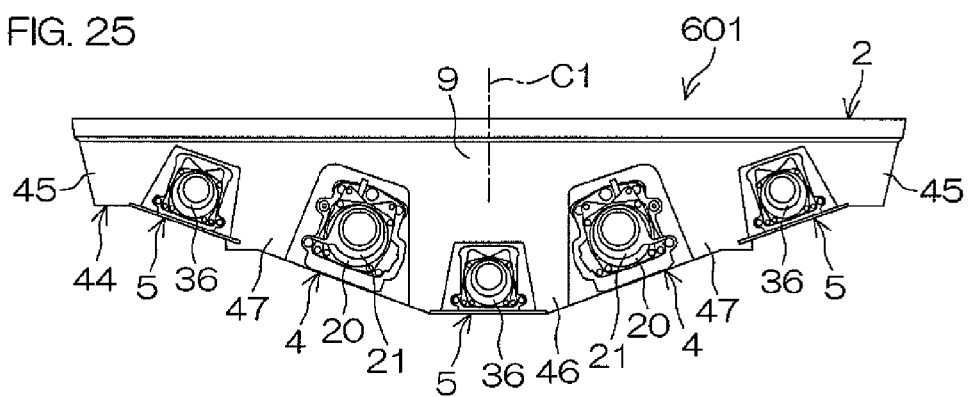
FIG. 25 is a rear view for explaining the arrangement of the vessel according to a sixth preferred embodiment of the present invention.

Also, for example, as in a vessel 601 shown in FIG. 25, three second propulsion mechanisms 5 may be disposed at the central portion 9 of the hull 2 and respective sides thereof, and a pair of first propulsion mechanisms 4 may be disposed at respective sides of the second propulsion mechanism 5 disposed at the central portion 9 of the hull 2. In this case, each first propulsion mechanism 4 may be disposed between the second propulsion mechanism 5 at the center and a second propulsion mechanism 5 at a side as shown in FIG. 25. Also, although not shown, each first propulsion mechanism 4 may be disposed further to the side than the second propulsion mechanism 5 at the side.

Also, with the first preferred embodiment, the case where the bottom portion 44 of the hull 2 preferably has a V-shaped configuration that is right/left symmetrical when viewed from the rear was described. However, the bottom portion 44 of the hull 2 does not have to be right/left symmetrical. Further, the bottom portion 44 of the hull 2 does not have to have a V-shaped configuration when viewed from the rear. Specifically, the bottom portion 44 of the hull 2 may, for example, have a U-shaped configuration that is right/left symmetrical when viewed from the rear or may be flat.

Figure 26:
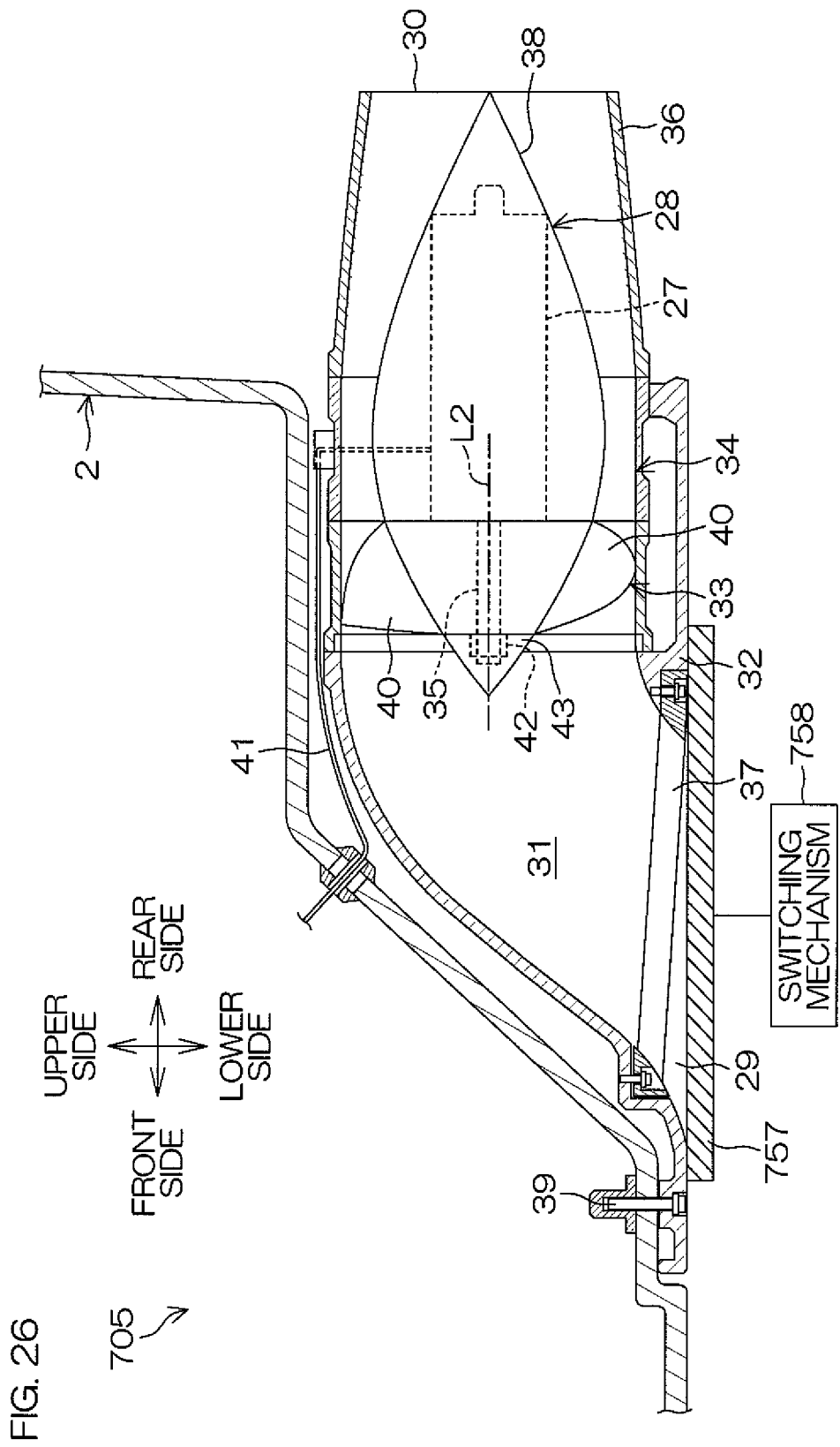
FIG. 26 is a partial sectional view for explaining an arrangement of second propulsion mechanism according to a seventh preferred embodiment of the present invention.

Also, with the first preferred embodiment, the case was described where, when the vessel 1 is being propelled by just the pair of the first propulsion mechanisms 4, the water entering into the second flow passages 31 from the second inlets 29 preferably rotate the second impellers 33. However, when water enters into the second flow passages 31 from the second inlets 29, resistance is applied to the vessel 1. Thus, as in a second propulsion mechanism 705 shown in FIG. 26, a lid 757 that covers the second inlet 29 and an opening/closing mechanism 758 that moves the lid 757 between an open position at which the second inlet 29 is opened and a closed position at which the second inlet 29 is closed may be provided. In this case, the second inlet 29 can be closed by the lid 757 and thus application of resistance to the vessel due to inflow of water into the second inlet 29 can be prevented.

Figure 27:
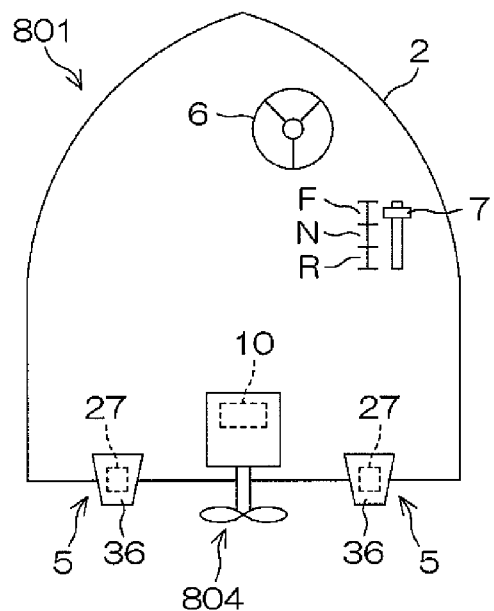
FIG. 27 is a plan view for explaining the arrangement of the vessel according to an eighth preferred embodiment of the present invention.

Also, with the first preferred embodiment, the case where each of the first propulsion mechanisms 4 and the second propulsion mechanisms 5 is a jet propulsion mechanism that includes a jet pump was described. However, the first propulsion mechanisms 4 may be propeller propulsion mechanisms that include propellers. The same applies to the second propulsion mechanisms 5. The propeller propulsion mechanism may be an inboard motor with which a drive source (engine 10 or electric motor 27) and a drive unit that transmits the power of the drive source to the propeller are disposed inside the hull 2. For example, as in a vessel 801 shown in FIG. 27, a first propulsion mechanism 804 may be an inboard motor and each of the pair of second propulsion mechanisms 5 may be a jet propulsion mechanism. Also, the propeller propulsion mechanism 4 may be an outboard motor with which the drive source and the drive unit are disposed outside the hull 2 or may be an inboard/outboard motor with which the drive source is disposed inside the hull 2 and the drive unit is disposed outside the hull 2.

Figure 28:
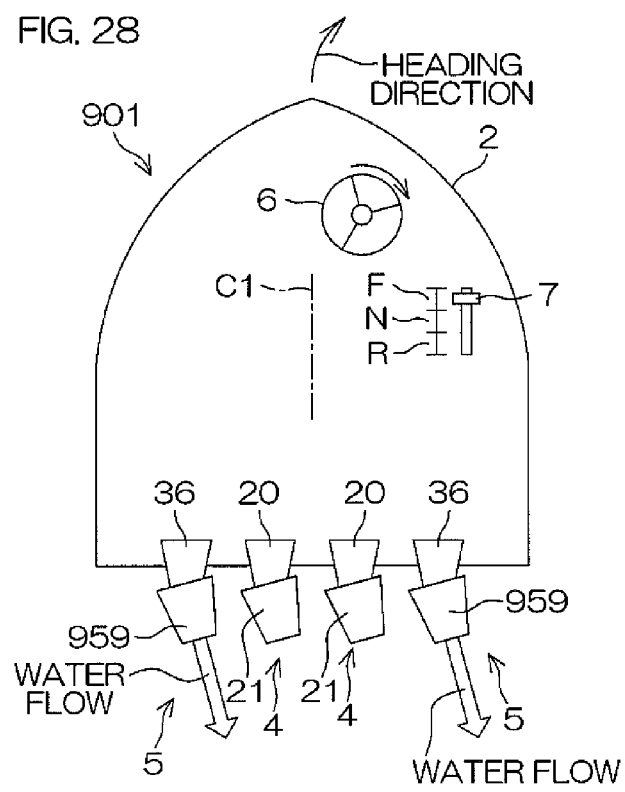
FIG. 28 is a plan view for explaining the arrangement of the vessel according to a ninth preferred embodiment of the present invention.

Also, with the first preferred embodiment, the case was described where, when the vessel 1 is to be turned, the main ECU 48 controls the pair of second propulsion mechanisms 5 such that the magnitude of the thrust from one second propulsion mechanism 5 and the magnitude of the thrust from the other second propulsion mechanism 5 differ. However, as in a vessel 901 shown in FIG. 28 and FIG. 29, each second propulsion mechanism 5 may include a second deflector 959 that changes the direction of water jetted from the second nozzle 36 to the right and left and the vessel 901 may be made to turn by changing the direction of jetting of water to the right or left by the second deflector 959. In this case, the main ECU 48 may control the pair of second propulsion mechanisms 5 such that the magnitudes of the thrusts from the respective second propulsion mechanisms 5 are matched as shown in FIG. 28 or may control the pair of second propulsion mechanisms 5 such that the magnitude of the thrust from one second propulsion mechanism 5 and the magnitude of the thrust from the other second propulsion mechanism 5 differ as shown in FIG. 29.

Also, with the first preferred embodiment, the case where the vessel 1 preferably is a boat was described. However, the vessel 1 may instead be a personal watercraft that includes a saddle type seat.

The present application corresponds to Japanese Patent Application No. 2011-049292 filed on Mar. 7, 2011 in the Japan Patent Office, the entire disclosure of which is hereby incorporated herein by reference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vessel comprising:
    a first propulsion mechanism including an internal combustion engine, the first propulsion mechanism being arranged to generate thrust by the internal combustion engine;
    at least one second propulsion mechanism including an electric motor and a jet pump driven by the electric motor, the at least one second propulsion mechanism being arranged to generate thrust by the jet pump being driven by the electric motor, the thrust generated by the at least one second propulsion mechanism being independent of the thrust generated by the first propulsion mechanism; and
    a hull in which the first propulsion mechanism and the at least one second propulsion mechanism are disposed such that a direction of the thrust generated by the first propulsion mechanism and a direction of the thrust generated by the at least one second propulsion mechanism are the same as each other.

2. The vessel according to claim 1, wherein the first propulsion mechanism includes a plurality of first blades and a first rotating shaft that is driven to rotate together with the plurality of first blades by the internal combustion engine; and
    the at least one second propulsion mechanism includes a plurality of second blades and a second rotating shaft that is driven to rotate together with the plurality of second blades by the electric motor, the second rotating shaft being independent of the first rotating shaft.

3. The vessel according to claim 2, wherein the first rotating shaft and the second rotating shaft are disposed in parallel or substantially in parallel.

4. The vessel according to claim 1, wherein the first propulsion mechanism further includes a jet pump driven by the internal combustion engine, and the first propulsion mechanism is arranged to generate thrust by the jet pump of the first propulsion mechanism being driven by the internal combustion engine.

5. The vessel according to claim 1, wherein the at least one second propulsion mechanism includes a pair of second propulsion mechanisms disposed at respective sides of a central portion of the hull in regard to a width direction of the hull; and
    the vessel further comprises a thrust controller programmed to control the pair of second propulsion mechanisms such that a magnitude of the thrust from one of the pair of second propulsion mechanisms differs from a magnitude of the thrust from the other of the pair of second propulsion mechanisms.

6. The vessel according to claim 1, wherein the at least one second propulsion mechanism includes a pair of second propulsion mechanisms disposed at respective sides of a central portion of the hull in regard to a width direction of the hull; and
    the first propulsion mechanism is disposed at the central portion of the hull in regard to the width direction of the hull.

7. The vessel according to claim 1, wherein the first propulsion mechanism is disposed at a central portion of the hull in regard to a width direction of the hull; and
    the at least one second propulsion mechanism is adjacent to the first propulsion mechanism.

8. The vessel according to claim 1, wherein the at least one second propulsion mechanism is disposed at a central portion of the hull in regard to a width direction of the hull.

9. The vessel according to claim 1, wherein the electric motor is arranged to be capable of forward rotation and reverse rotation;

the jet pump includes an outlet; and the jet pump and is arranged to jet water from the outlet in accordance with the forward rotation of the electric motor and to suck in water from the outlet in accordance with the reverse rotation of the electric motor.

10. The vessel according to claim 1, further comprising a switching controller programmed to control the first propulsion mechanism and the at least one second propulsion mechanism such that the vessel is propelled by the at least one second propulsion mechanism in a low speed region in which a speed of the vessel is less than a predetermined first speed and the vessel is propelled by the first propulsion mechanism in a high speed region in which the speed of the vessel is not less than a predetermined second speed that is not less than the first speed.

11. The vessel according to claim 10, wherein the switching controller is programmed to control the first propulsion mechanism and the at least one second propulsion mechanism such that the vessel is propelled by the first propulsion mechanism and the at least one second propulsion mechanism in a medium speed region in which the speed of the vessel is not less than the first speed and less than the second speed.

12. The vessel according to claim 11, wherein the switching controller is programmed to control the first propulsion mechanism and the at least one second propulsion mechanism such that in the medium speed region, the thrust of the first propulsion mechanism increases in accordance with an increase in the speed of the vessel and the thrust of the at least one second propulsion mechanism decreases in accordance with the increase in the speed of the vessel.

13. The vessel according to claim 10, wherein the hull includes a bottom portion with a V-shaped configuration as seen from a rearward view, the bottom portion including a central portion that is positioned at a lowest position when the hull is viewed from the rear;

the first propulsion mechanism is disposed at the bottom portion; and the at least one second propulsion mechanism is disposed at the bottom portion such that a distance in a width direction of the hull from the central portion is greater than a distance in the width direction of the hull from the central portion to the first propulsion mechanism.

14. The vessel according to claim 1, wherein the electric motor is arranged to generate electric power by being driven to rotate by a water flow flowing into the at least one second propulsion mechanism when the vessel is being propelled by the first propulsion mechanism in a state in which the at least one second propulsion mechanism is not generating thrust; and the vessel further comprises a battery that is connected to the electric motor and arranged to be charged by the electric power generated by the electric motor.

15. A vessel comprising:

a first propulsion mechanism including an internal combustion engine and a first jet pump driven by the internal combustion engine, the first propulsion mechanism being arranged to generate thrust by the first jet pump being driven by the internal combustion engine;

at least one second propulsion mechanism including an electric motor, the at least one second propulsion mechanism being arranged to generate thrust by the electric motor, the thrust generated by the at least one second propulsion mechanism being independent of the thrust generated by the first propulsion mechanism; and a hull in which the first propulsion mechanism and the at least one second propulsion mechanism are disposed such that a direction of the thrust generated by the first propulsion mechanism and a direction of the thrust generated by the at least one second propulsion mechanism are the same as each other.

\* \* \* \* \*